(12) United States Patent
Irwin, III et al.

(10) Patent No.: US 12,248,555 B2
(45) Date of Patent: *Mar. 11, 2025

(54) SYSTEMS AND METHODS INCLUDING USER AUTHENTICATION

(71) Applicant: Orchid Authentication Systems Inc., Wilmington, DE (US)

(72) Inventors: John N. Irwin, III, Greenwich, CT (US); Priscilla Babb, Walnut, CA (US); R. Maxwell Flaherty, Topsfield, MA (US); J. Christopher Flaherty, Nottingham, NH (US)

(73) Assignee: ORCHID AUTHENTICATION SYSTEMS INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,943

(22) Filed: Jan. 29, 2024

(65) Prior Publication Data

US 2024/0427870 A1    Dec. 26, 2024

Related U.S. Application Data

(63) Continuation of application No. 18/039,364, filed as application No. PCT/US2021/062809 on Dec. 10, 2021, now Pat. No. 11,934,508.
(Continued)

(51) Int. Cl.
*G06F 21/34* (2013.01)
*G06F 21/32* (2013.01)
*H04W 12/55* (2021.01)

(52) U.S. Cl.
CPC .............. *G06F 21/34* (2013.01); *G06F 21/32* (2013.01); *H04W 12/55* (2021.01)

(58) Field of Classification Search
CPC ......... G06F 21/34; G06F 21/32; H04W 12/55
See application file for complete search history.

(56) References Cited

U.S. PATENT DOCUMENTS

| 7,673,141 B2 | 3/2010 | Kilian-Kehr et al. |
| 8,700,392 B1 | 4/2014 | Hart et al. |
| (Continued) |

FOREIGN PATENT DOCUMENTS

| WO | 2020092832 | 5/2020 |
| WO | 2022125898 | 6/2022 |
| WO | 2023244602 | 12/2023 |

OTHER PUBLICATIONS

Extended European Search Report dated Feb. 23, 2024 issued in European Application No. 21904468.2.
(Continued)

*Primary Examiner* — Huan V Doan
(74) *Attorney, Agent, or Firm* — Onello & Mello, LLP

(57) ABSTRACT

Systems, methods, and software products provide increased trust in authentication of a user to an authentication server when a trusted witness client device witnesses the authentication of the user on the user's root client device. Both the root and the witness client devices cooperate to present the user with an interactive task during the authentications and each client device independently captures movement of the user performing the interactive task, during which, the user is authenticated to the root client device. An increased level of trust in the authentication of the user is achieved by the authentication server when the captured movements match expected movements of the user performing the interactive task and the authentication server has proof that the witness client devices witnessed a successful authentication.

27 Claims, 14 Drawing Sheets

Related U.S. Application Data

(60) Provisional application No. 63/123,950, filed on Dec. 10, 2020.

(56) References Cited

U.S. PATENT DOCUMENTS

| | | |
|---|---|---|
| 9,081,947 B2 | 7/2015 | Dewan et al. |
| 9,130,929 B2 | 9/2015 | Dorfman et al. |
| 9,166,986 B1 | 10/2015 | Saylor et al. |
| 9,294,474 B1 | 3/2016 | Alikhani |
| 9,600,069 B2 | 3/2017 | Publicover et al. |
| 9,876,788 B1 | 1/2018 | Ziraknejad et al. |
| 9,887,975 B1 | 2/2018 | Gifford et al. |
| 9,934,373 B1 | 4/2018 | Ziraknejad et al. |
| 9,953,149 B2 | 4/2018 | Tussy |
| 10,360,464 B1 | 7/2019 | McKay et al. |
| 10,373,277 B2 | 8/2019 | Kaminski et al. |
| 10,375,114 B1 | 8/2019 | Gu et al. |
| 11,003,410 B2 | 5/2021 | Blume et al. |
| 11,133,937 B2 | 9/2021 | Eliezer |
| 2005/0268096 A1 | 12/2005 | Kilian-Kehr et al. |
| 2009/0007234 A1 | 1/2009 | Birger et al. |
| 2014/0230046 A1 | 8/2014 | Dewan et al. |
| 2014/0282961 A1 | 9/2014 | Dorfman et al. |
| 2015/0326570 A1 | 11/2015 | Publicover et al. |
| 2016/0063235 A1 | 3/2016 | Tussy |
| 2017/0004591 A1 | 1/2017 | Kaminski et al. |
| 2018/0041484 A1 | 2/2018 | Gifford et al. |
| 2018/0205546 A1 | 7/2018 | Haque et al. |
| 2019/0036707 A1 | 1/2019 | Eliezer |
| 2019/0250873 A1 | 8/2019 | Blume et al. |
| 2019/0279183 A1* | 9/2019 | Chen ............ G06Q 20/327 |
| 2020/0045044 A1* | 2/2020 | Turgeman ........ G06F 3/03543 |
| 2021/0234862 A1 | 7/2021 | Wang |
| 2022/0253626 A1 | 8/2022 | Filter et al. |

OTHER PUBLICATIONS

International Report on Patentability dated Jun. 13, 2023 issued in International Application No. PCT/US2021/062809.

International Search Report and Written Opinion dated Feb. 28, 2022 issued in International Application No. PCT/US2021/062809.

International Search Report and Written Opinion dated Jan. 27, 2020 issued in International Application No. PCT/US19/59248.

International Search Report and Written Opinion dated Sep. 14, 2023 issued in International Application No. PCT/US2023/025196.

"Systems and Methods Including User Authentication" Specification, Drawings, and Prosecution History of U.S. Appl. No. 18/039,364, filed May 30, 2023, now U.S. Pat. No. 11,934,508, issued Mar. 19, 2024, by John N. Irwin III, et al., which is stored in the United States Patent and Trademark Office (USPTO).

International Preliminary Report on Patentability dated Dec. 26, 2024 issued in International Application No. PCT/US2023/025196.

\* cited by examiner

SYSTEMS AND METHODS INCLUDING USER AUTHENTICATION

RELATED APPLICATION

The present application is a continuation of U.S. National Stage application Ser. No. 18/039,364, titled "Multi-Platen Ultrasound Fingerprint Sensors and Associated Methods", filed May 30, 2023, Publication Number US 2023/0350999, published Nov. 2, 2023, which claims the benefit of priority from International PCT Patent Application Serial Number PCT/US21/062809, titled "Systems and Methods Including User Authentication", filed Dec. 10, 2021, Publication Number WO2022/0125898, published Jun. 16, 2022, which claims the benefit of priority from U.S. Provisional Patent Application Ser. No. 63/123,940, titled "Authentication Witness Systems and Methods", filed Dec. 10, 2020, the content of each of which is incorporated herein by reference in its entirety for all purposes.

This application is related to U.S. Provisional Application Ser. No. 62/753,305, titled "Passwordless Authentication", filed Oct. 31, 2018, the content of which is incorporated by reference in its entirety for all purposes.

This application is related to International PCT Patent Application Serial Number PCT/US19/059248, titled "Passwordless Authentication Systems and Methods" filed Oct. 31, 2019, Publication Number WO 2020/092832, published May 7, 2020, the content of which is incorporated by reference in its entirety for all purposes.

This application is related to U.S. National Stage Application Ser. No. 17/290,740, titled "Passwordless Authentication Systems and Methods", filed Apr. 30, 2021, Publication Number US 2022/0004617, published Jan. 6, 2022, the content of which is incorporated by reference in its entirety for all purposes.

This application is related to U.S. Provisional Patent Application Ser. No. 63/351,635 titled "Systems and Methods That Provide a High Level of Security for a User", filed Jun. 13, 2022, the content of which is incorporated herein by reference in its entirety for all purposes.

This application is related to International PCT Patent Application Serial Number PCT/US23/025196, titled "Systems and Methods That Provide a High Level of Security for a User", filed Jun. 13, 2023, Publication Number WO2023/244602, published Dec. 21, 2023, the content of which is incorporated by reference in its entirety for all purposes.

FIELD OF INVENTIVE CONCEPTS

The present inventive concepts relate generally to systems, devices, and methods that provide a routine to authenticate one or more users, such as by using a witness.

BACKGROUND

Two-factor authentication improves trust for online accounts by verifying the identity of someone logging into that account through a second device associated with the account or authentic user. For example, when a user logs into a website (e.g. an online store to make a purchase), the website may send a new randomly generated code to a computing device (e.g. a smartphone) previously associated with the registered user of the account, asking that the user input that code to the website. For the code to be entered correctly at the website, the user must also have access to the associated computing device to receive the code. Thus, a correctly entered code provides the website with additional trust that the user is authentic.

Biometric authentication, where a computer device (e.g. a smartphone) compares sensed biometric characteristics of a user attempting to access the computer device, proves a strong level of security for the computer device. Often, such authentication is used within an application running on the computer device when used to access other resources. However, trust that the user is who they claim to be is limited to the trust that the single computer device has not been compromised.

SUMMARY

One aspect of the present embodiments includes the realization that increasing use of biometrics on a single authenticating device (e.g. a smartphone with a fingerprint reader, and/or facial recognition), to identify and authenticate a user (e.g. an individual person), results in a misplaced high level of trust in believing that the single authenticating device has not been compromised. This misplaced and/or limited level of trust in the single authenticating device is realized when the user attempts to access a high value or highly sensitive resource, such as making a high value monetary transaction. An entity controlling the access, or making the transaction, often requires a higher level of assurance (e.g. evidence) that the user is who they claim to be that can be provided by the limited trust in the single authenticating device. However, since unique biometric data (e.g. a fingerprint or 3D facial ID) often cannot, for security and/or policy-driven reasons, be sent to a website or uploaded to the cloud for authentication, trust in biometric authentication relies on the single authenticating device not being compromised.

The present embodiments solve this problem by using two devices concurrently, since it is significantly more difficult to compromise two independent devices than it is to compromise a single device. A second client device (a witness client device) is used to witness an authentication (e.g. a biometric authentication and/or another authentication method) of the user on the first authenticating device (a root client device). That is, the witness client device witnesses the authentication of the user on the root client device and provides evidence thereof. The root client device can belong to the individual being authenticated (the "user") and the witness client device may be one of (a) another device belonging to the user, (b) a device belonging to a party preauthorized for witnessing the authentication of the user, or (c) a previously unknown device. As the root client device performs an authentication (e.g. at least a biometric authentication) of the user, the witness client device captures and provides evidence, without including sensitive confidential data (e.g. biometric images and/or other sensitive data), to an authentication server. In some embodiments, the witness client device was present during the authentication performed on the root client device. The root client device and the witness client device can be positioned adjacent to one another as the user authenticates, and both the root and witness client devices can capture various evidence of the identification of the user, such as non-identifying evidence that includes movement data, action data, physiologic data, and/or other user data used to identify a user and/or identify a person as an imposter (singly or collectively "recognition data", "user recognition data", "biometric data", "biometric information", "biometric characteristics", "biometric signature", and/or "biometrics" herein). In some embodiments, user recognition data comprises data related to movement selected from the group consisting of: one or more of: head movement eye and/or eyelid movement; mouth movement; lip movement; tongue movement; facial expressions; facial muscle movement, arm movement, wrist movement; hand movement; finger movement; other body part movement; and combinations of these. In some embodiments, user recognition data comprises physiologic data of the user selected from the group consisting of: PPG data; blood flow data; blood pressure data; respiration data; DNA data; EKG data; perspiration data; other physiologic data; and combinations of these. In some embodiments, recognition data, such as that described herein, can comprise data collected from a witness and used to authenticate a witness. The root and witness client devices can independently send the captured recognition data to an authentication server where it is processed, such as to determine that both client devices were present during an authentication of the user. Further, the user, and sometimes the witness, may be asked to perform a task (e.g. a randomly selected and/or randomly generated interactive task) during the authentication such that the recognition data includes data related to movements corresponding to the task that may be evaluated by the authentication server to determine that the particular task was performed at the time of authentication, and that the evidence provided regarding performance of the task was not previously recorded. For example, if the task is randomly selected and/or randomly generated, the required movement is not predictable; thus, previously recorded evidence would not match expected movements and is therefore detected as fraudulent by the authentication server.

A level of trust in the authentication of the user is increased by a level of trust in the witness client device since the witness client device also authenticates the witness prior to and/or after witnessing authentication of the user by the root client device. In one analogy, the witness client device acts with the root client device like a notary public serving as an impartial witness when another person signs important documents. This higher level of trust is afforded, at least in part, by the increased probability that a "nefarious party" is unlikely to have compromised both the root client device and the witness client device, and in part by the fact that the application running on both the root client device and the witness client device includes a combination of measures that make spoofing and scamming the authentication and witnessing difficult if not impossible. As a further measure of authenticity, the roles of the user and the witness may be reversed such that the witness is also authenticated and witnessed. Advantageously, the described systems and methods provide a particular added value of confirming that the user and witness using biometrics on their own client devices, while simultaneously capturing and sharing movements related to the biometric authentications with a website requiring a confirmation of the authentication, and without sharing any unique identifying biometric information with the website. This witnessed authentication improves trust for the website that the user being authenticated by the root client device is who they claim to be.

A person (e.g. an individual to be authenticated, the "user" herein) may have a group of people (e.g. friends) that they trust to confirm their identity to a third party. Such people are likely better at identifying the user than some remote and often unknown person at a third-party entity (e.g. a bank, cable service, and/or cellular access company) who asks them to verify predefined answers to one or more preset questions (e.g. a name of their first pet, a name of their teacher in 8th grade, and the like). The embodiments described herein provide a service that allows the user to call on any one or more of these trusted people to witness authentication for a third party, such as a website, a bank, and the like. Such witnessing may occur in person when the user and the witness are at the same location, or remotely when the witness is not at the same location as the user. The use of a shared virtual screen that appears in part on the root client device and in part on the witness client device, enables the website to verify that the root client device and the witness client device are near one another as the user interacts with the virtual screen on both client devices.

In some embodiments, a witnessed authentication method includes: determining, at an authentication server, that a higher level of trust in authentication of a user is required and/or desired ("required" herein) for the user to access a protected resource; receiving, at the authentication server from a first application running on a root client device associated with the user, a current location of the root client device; selecting, based upon the current location, a witness client device that (a) has previously been configured to provide witness services to the authentication server, and (b) is near the current location; directing, via a second application running on the witness client device, an owner of the witness client device to (a) authenticate on the witness client device and then (b) to hand the witness client device to the user; synchronizing the root and witness client devices using the first and second applications; authenticating the user on the root client device using a user recognition routine (e.g. a facial recognition routine) to determine an authentication result; corroboratively implementing, between the root and witness client devices, an interactive task randomly selected by the authentication server to cause the user to make predefined facial movements; capturing, by the first application on the root client device, first recognition data (e.g. first movement data of facial movements) detected by the root client device as the user performs the interactive task; capturing, concurrently by the second application on the witness client device, second recognition data (e.g. second movement data of facial movements) detected by the witness client device as the user performs the interactive task; receiving, at the authentication server from the root client device, an authentication result indicative of success of the authentication of the user and the first recognition data; receiving, at the authentication server from the witness client device, the second recognition data; and determining, based upon the authentication result, the first recognition data, the second recognition data, and expected recognition data, whether the user is authorized to access the protected resource.

In some embodiments, a witnessed authentication method using a root client device and a witness client device, includes: receiving, by an application running on a first client device, a message including a task code from an authentication server; synchronizing the first client device with a second client device; generating, for display by the first client device and based at least in part upon the task code, at least part of a virtual screen of an interactive task implemented by (e.g. split between) both the first and second client devices; when the first client device is the root client device: invoking authentication of a user on the first client device; capturing first recognition data (e.g. first movement data and/or first action data) detected by the first client device as the user performs the interactive task; and sending authentication results and the first recognition data to the authentication server, when the second client device is the witness client device: capturing second recognition data (e.g. second movement data) detected by the second client device as the user performs the interactive task; and sending the second recognition data to the authentication server. The authentication server determines whether witnessed authentication of the user is successful based upon the authentication result, the first recognition data, and the second recognition data.

In some embodiments, a witnessed authentication method includes: determining, at an authentication server, a higher level of trust is required for a user of an account; selecting a root client device based upon the account; selecting a witness client device; generating a task code defining an interactive task and expected user response (e.g. user movement and/or other user action) of the user such that the interactive task is not predictable; sending a message with the task code to the root client device; sending a message with the task code to the witness client device; receiving authentication results and first recognition data (e.g. first movement data and/or action data) from the root client device, the authentication result defining whether the user authenticated successfully on the root client device and the first recognition data defining a first user response (e.g. a user movement and/or user action) of the user as detected by the root client device during witnessed authentication of the user; receiving second recognition data (e.g. second movement data and/or action data) from the witness client device, the second recognition data defining a second user response (e.g. a user movement and/or user action) of the user as detected by the witness client device; and evaluating the authentication results and comparing the first recognition data, the second recognition data, and expected physiologic response (e.g. expected movement) to determine success or failure of the witnessed authentication.

In some embodiments, a software product includes instructions, stored on computer-readable media, wherein the instructions, when executed by a computer, perform steps for witnessing authentication of a first user of a root client device, the software product including: a first computer-readable media in a root client device, comprising: instructions for receiving a first message including a task code from an authentication server; instructions for synchronizing with a witness client device; instructions for generating, for display by the root client device and based upon the task code, at least part of a virtual screen of an interactive task implemented by both the root client device and the witness client device; instructions for invoking authentication of the user to generate an authentication result; instructions for capturing first recognition data (e.g. first movement data) detected by the root client device as the user performs the interactive task; and instructions for sending the authentication result and the first recognition data to an authentication server; and a second computer-readable media in a witness client device, comprising: instructions for receiving a second message including the task code from the authentication server, instructions for synchronizing with the root client device; instructions for generating, for display by the witness client device and based upon the task code, at least part of the virtual screen of the interactive task implemented by both the root client device and the witness client device; instructions for capturing second recognition data (e.g. second movement data) detected by the witness client device as the user performs the interactive task; and instructions for sending the second recognition data to the authentication server.

INCORPORATION BY REFERENCE

All publications, patents, and patent applications mentioned in this specification are herein incorporated by reference to the same extent as if each individual publication, patent, or patent application was specifically and individually indicated to be incorporated by reference. The content of all publications, patents, and patent applications mentioned in this specification are herein incorporated by reference in their entirety for all purposes.

DETAILED DESCRIPTION OF THE DRAWINGS

Figure 1:
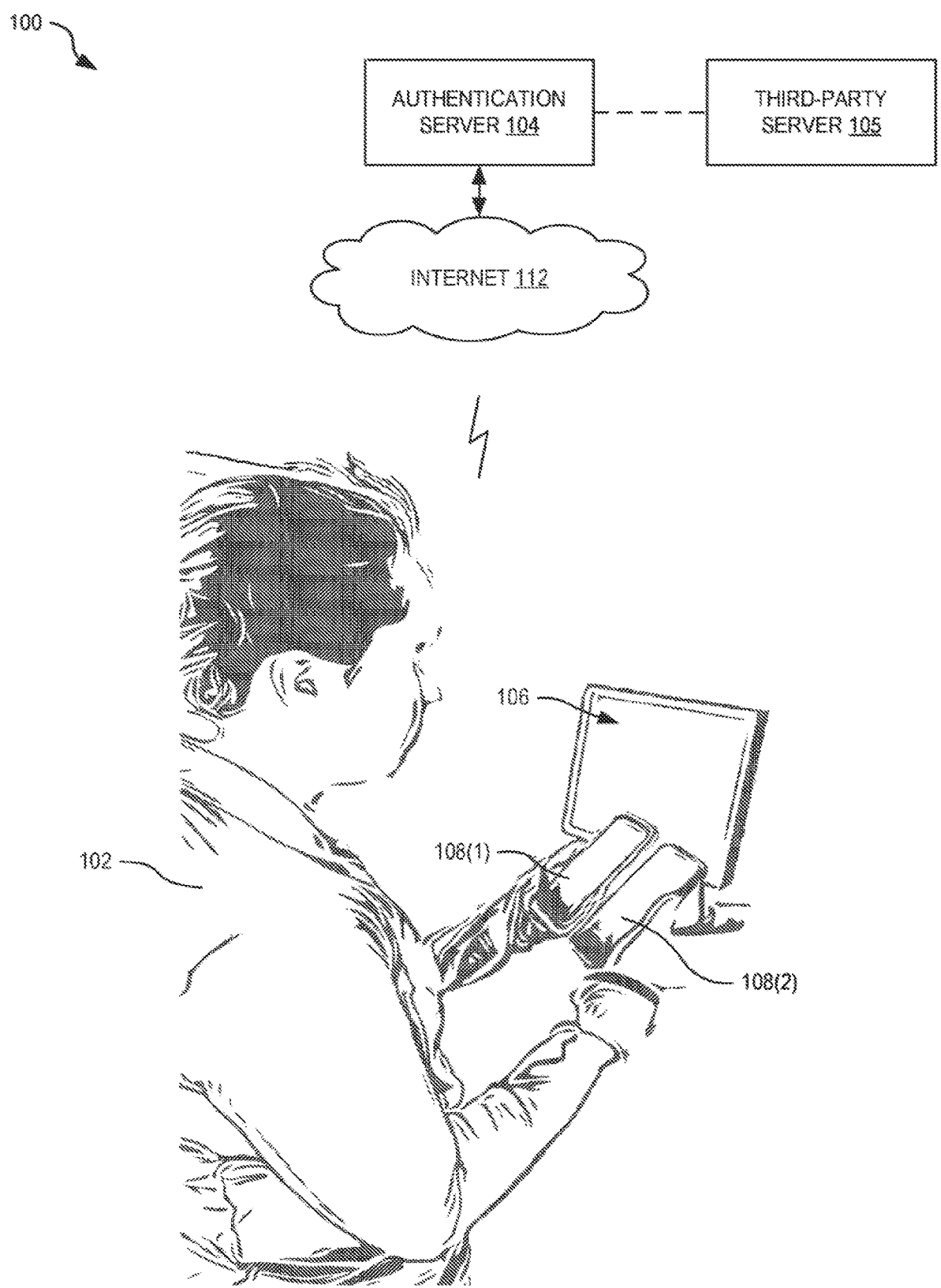
FIG. 1 illustrates one example of an authentication witness system that provides improved level of trust when authenticating a user to an authentication server, consistent with the present inventive concepts.

The terminology used herein is for the purpose of describing particular embodiments and is not intended to be limiting of the inventive concepts. Furthermore, embodiments of the present inventive concepts may include several novel features, no single one of which is solely responsible for its desirable attributes or which is essential to practicing an inventive concept described herein. As used herein, the singular forms "a," "an" and "the" are intended to include the plural forms as well, unless the context clearly indicates otherwise.

It will be further understood that the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers, and/or sections, these limitations, elements, components, regions, layers, and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on", "attached", "connected" or "coupled" to another element, it can be directly on or above, or connected or coupled to, the other element, or one or more intervening elements can be present. In contrast, when an element is referred to as being "directly on", "directly attached", "directly connected" or "directly coupled" to another element, there are no intervening elements present. Other words used to describe the relationship between elements should be interpreted in a like fashion (e.g. "between" versus "directly between," "adjacent" versus "directly adjacent," etc.). A first component (e.g. a device, assembly, housing or other component) can be "attached", "connected" or "coupled" to another component via a connecting filament (as defined below). In some embodiments, an assembly comprising multiple components connected by one or more connecting filaments is created during a manufacturing process (e.g. pre-connected at the time of an implantation procedure of the apparatus of the present inventive concepts). Alternatively or additionally, a connecting filament can comprise one or more connectors (e.g. a connectorized filament comprising a connector on one or both ends), and a similar assembly can be created by a user operably attaching the one or more connectors of the connecting filament to one or more mating connectors of one or more components of the assembly.

It will be further understood that when a first element is referred to as being "in", "on" and/or "within" a second element, the first element can be positioned: within an internal space of the second element, within a portion of the second element (e.g. within a wall of the second element); positioned on an external and/or internal surface of the second element; and combinations of one or more of these.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in a figure is turned over, elements described as "below" and/or "beneath" other elements or features would then be oriented "above" the other elements or features. The device can be otherwise oriented (e.g. rotated 90 degrees or at other orientations) and the spatially relative descriptors used herein interpreted accordingly.

As used herein, the term "proximate" shall include locations relatively close to, on, in, and/or within a referenced component or other location.

The term "and/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

The term "functional element" where used herein, is the be taken to include a component comprising one, two or more of: a sensor; a transducer; an electrode; an energy delivery element; an agent delivery element; a magnetic field generating transducer; and combinations of one or more of these. In some embodiments, a functional element comprises a transducer selected from the group consisting of: light delivery element; light emitting diode; wireless transmitter; Bluetooth device; mechanical transducer; piezoelectric transducer; pressure transducer; temperature transducer; humidity transducer; vibrational transducer; audio transducer; speaker; and combinations of one or more of these. In some embodiments, a functional element comprises a needle, a catheter (e.g. a distal portion of a catheter), an iontophoretic element or a porous membrane, such as an agent delivery element configured to deliver one or more agents. In some embodiments, a functional element comprises one or more sensors selected from the group consisting of: electrode; sensor configured to record electrical activity of tissue; blood glucose sensor such as an optical blood glucose sensor; pressure sensor; blood pressure sensor; heart rate sensor; inflammation sensor; neural activity sensor; muscular activity sensor; pH sensor; strain gauge; accelerometer; gyroscope; GPS; respiration sensor; respiration rate sensor; temperature sensor; magnetic sensor; optical sensor; MEMs sensor; chemical sensor; hormone sensor; impedance sensor; tissue impedance sensor; body position sensor; body motion sensor; physical activity level sensor; perspiration sensor; hydration sensor; breath monitoring sensor; sleep monitoring sensor; food intake monitoring sensor; urine movement sensor; bowel movement sensor; tremor sensor; pain level sensor; orientation sensor; motion sensor; and combinations of one or more of these.

The term "transducer" where used herein is to be taken to include any component or combination of components that receives energy or any input, and produces an output. For example, a transducer can include an electrode that receives electrical energy, and distributes the electrical energy to tissue (e.g. based on the size of the electrode). In some configurations, a transducer converts an electrical signal into any output, such as light (e.g. a transducer comprising a light emitting diode or light bulb), sound (e.g. a transducer comprising a piezo crystal configured to deliver ultrasound energy), pressure, heat energy, cryogenic energy, chemical energy, mechanical energy (e.g. a transducer comprising a motor or a solenoid), magnetic energy, and/or a different electrical signal (e.g. a Bluetooth or other wireless communication element). Alternatively or additionally, a transducer can convert a physical quantity (e.g. variations in a physical quantity) into an electrical signal. A transducer can include any component that delivers energy and/or an agent to tissue, such as a transducer configured to deliver one or more of: electrical energy to tissue (e.g. a transducer comprising one or more electrodes); light energy to tissue (e.g. a transducer comprising a laser, light emitting diode and/or optical component such as a lens or prism); mechanical energy to tissue (e.g. a transducer comprising a tissue manipulating element); sound energy to tissue (e.g. a transducer comprising a piezo crystal); thermal energy to tissue (e.g. heat energy and/or cryogenic energy); chemical energy; electromagnetic energy; magnetic energy; and combinations of one or more of these.

The term "transmission signal" where used herein is to be taken to include any signal transmitted between two components, such as via a wired or wireless communication pathway. A transmission signal can include one or more signals transmitted using skin conduction. Alternatively or additionally, a transmission signal can comprise reflected energy, such as energy reflected from any power and/or data signal.

The term "data signal" where used herein is to be taken to include a transmission signal including at least data. A data signal can comprise a radiofrequency signal including data (e.g. a radiofrequency signal including both power and data) and/or a data signal sent using skin conduction.

The terms "attachment", "attached", "attaching", "connection", "connected", "connecting" and the like, where used herein, are to be taken to include any type of connection between two or more components. The connection can include an "operable connection" or "operable attachment" which allows multiple connected components to operate together such as to transfer information, power, and/or material (e.g. an agent to be delivered) between the components. An operable connection can include a physical connection, such as a physical connection including a connection between two or more: wires or other conductors (e.g. an "electrical connection"), optical fibers, wave guides, tubes such as fluid transport tubes, and/or linkages such as translatable rods or other mechanical linkages. Alternatively or additionally, an operable connection can include a non-physical or "wireless" connection, such as a wireless connection in which information and/or power is transmitted between components using electromagnetic energy. A connection can include a connection selected from the group consisting of: a wired connection; a wireless connection; an electrical connection; a mechanical connection; an optical connection; a sound propagating connection; a fluid connection; and combinations of one or more of these.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. For example, it will be appreciated that all features set out in any of the claims (whether independent or dependent) can be combined in any given way.

Information sent over the Internet may be captured and used by a nefarious party (e.g. one or more nefarious persons). In a simple example, a nefarious party captures and replays login credentials used by an authorized person to access a website and imitate the authorized person. A biometric image may be similarly captured and replayed to gain unauthorized access to a website. Accordingly, biometric authentication requires that biometric data (e.g. facial images, fingerprint images, and other forms of biometric data such as those described herein) of the person being authenticated is not sent over the Internet. For example, on a "client device" (e.g. a smartphone, tablet computer, laptop computer, and the like) authentication is handled by a secure enclave of the client device such that biometric images and/or other sensitive information are not transferred or uploaded to a cloud service for evaluation, and are not stored on the client device. This practice has become an industry norm that may be regulated in certain regions Two-factor authentication is an improvement over conventional user-name and password login authentication, since it requires that the person accessing the protected resource (e.g. website) also has access to a trusted device (e.g. a smartphone or other client device previously associated with the protected resource). Two-factor authentication thus blocks access through mere copying and replaying of credentials without simultaneous access to the trusted device. However, two-factor authentication may still provide insufficient proof of a person's authenticity, such as when the resource being protected has high value (e.g. large value transactions, transfer of power, and the like). Although unlikely, one vulnerability of two-factor authentication is that the SIM card of the trusted device is stolen and used in an "impersonating device". When a code is sent to the trusted device using the corresponding phone number, the code is received on the impersonating device, thereby allowing an imposter to provide the code to a website and gain access.

Levels of Trust

A first level of trust, that the user is who they say they are, is based on biometric information of the user being authenticated by a client device. The client device can be for example a smartphone, and includes at least one biometric sensor (e.g. a camera for facial recognition, a fingerprint sensor for fingerprint recognition, a sensor for recording or otherwise measuring motion of a body part of the user, a sensor for measuring a physiologic parameter of the user, and the like) that authenticates presented biometric information (e.g. presented by the user) to the client device. The client device can authenticate the presented biometric information of the user without storing biometric information on the client device and/or without sending the biometric information to a separate device (e.g. a server of a third party). However, this authentication requires trust that the client device is not compromised; thus, the trust is based on integrity of the single client device. In the well-known two-factor authentication, trust of the client device is confirmed by sending an unpredictable (e.g. random) code value to the client device via a trusted path (e.g. a text message sent to a known phone number of the device) and asking the user of a website to input that code, thereby requiring that the user accessing the website also has access to the client device. Since the client device requires authentication of the user to access the code, when the code is entered correctly to the website, the user has proved trust in the client device to the website.

The systems of the present inventive concepts can be configured to perform various passwordless authentication methods, such as those described in co-pending U.S. patent application Ser. No. 17/290,740, titled "Passwordless Authentication Systems and Methods", filed Apr. 30, 2021.

Overcoming Limited Trust in a Single Client Device

Using a single client device to authenticate a user to a third party relies upon the level of trust that the third party has in that client device. This level of trust is based on the owner of the device immediately reporting a loss, and of trusting that the owner of the device is using the biometric authentication built into that device to prevent misuse. However, even with built in biometric authentication, a determined hacker may gain access to that device, or to its SIM card. Thus, the trust in a single client device has limitations and reliance that the client device is not compromised. For situations where trust in a single client device is insufficient, such as where an asset being accessed (e.g. a high-value transaction, a high-cost action, and the like) requires a higher level of trust than afforded by the single client device, a third-party responsible for that asset may not permit access (or permit an associated transaction or other event requiring authentication) until a higher level of trust is provided. For example, the third party may require additional proof of identity, even physical appearance, before allowing the access or performing the requested transaction or other event.

The embodiments herein provide increased trust over the use of a single client device, by additionally using a second client device, a "witness client device" (also referred to as "witness device" herein), to further witness the authentication of the user on a first client device, a "root client device" (also referred to as "root device" herein). More particularly, the root and witness client devices independently provide evidence that the two client devices were at the same location during witnessing of the authentication. Since a nefarious party would need to compromise each of the two client devices, the use of both client devices to authenticate and witness the authentication provides an increased level of trust (a third level of trust), particularly when the witness client device is also known to the third party. This additional trust can be achieved by using a second trusted client device (a witness client device belonging to a second trusted party) to verify (e.g. witness) the authentication of the user on the root client device. Evidence of witnessing the authentication of the user to the root client device is sent to the third party (e.g. the entity operating the website and/or otherwise requiring authentication of the event) where it can be used to further increase trust in the authentication by eliminating or at least reducing ("eliminating", "preventing" or "reducing" herein) spoofing and scamming possibilities.

The following embodiments are described using facial authentication to gather "user recognition data" (also referred to as "recognition data" herein), but it should be considered within the spirit and scope of the present inventive concepts that other types of user identification could be used. For example, other types of biometric authentication could be used to gather user recognition data, such as iris recognition, retinal scanning, physiologic parameter analysis, and the like. User recognition data can comprise movement data gathered from the user, such as movement of the user's head, eyes, mouth, lips, tongue, facial muscles, and/or other body part movement. Movement data of the present inventive concepts (e.g. movement data 238, 240, 1306, and/or 1336 described hereinbelow) can comprise one or more forms of movement data as described herein, as well as other user recognition data, such as data related to a task or other action of the user, and/or physiologic information of the user.

Recognition data of the present inventive concepts can comprise data related to an image, such as image data created by a device selected from the group consisting of: a visible light camera and/or an infrared camera; a laser or other optical imaging device; an X-ray imager; a CT-scan imager; an ultrasound imager; a PET scan imager; another imaging device; and combinations of these. The image data can comprise fingerprints, palm prints, and/or toe prints. The image data can comprise images of the patient's eye (e.g. a retinal scan image), face, teeth, bones, blood vessels, and/or other body parts.

Alternatively or additionally, recognition data of the present inventive concepts can comprise data associated with motion of the user, such as motion of the user's head, face, eye, mouth, lips, tongue, arm, wrist, finger, and/or other body part.

Alternatively or additionally, recognition data of the present inventive concepts can comprise data related to a physiologic parameter of the patient, such as a physiologic parameter selected from the group consisting of: blood oxygen level (e.g. as determined using a pulse oximeter); blood volume; a parameter determined from a photoplethysmogram (PPG); blood pressure; heart rate; heart electrical activity (e.g. EKG data); respiration; brain waves (e.g. EEG, LFP, and/or neural spike data); blood glucose; a blood gas level; another physiologic parameter; and combinations of these.

Figure 2A:
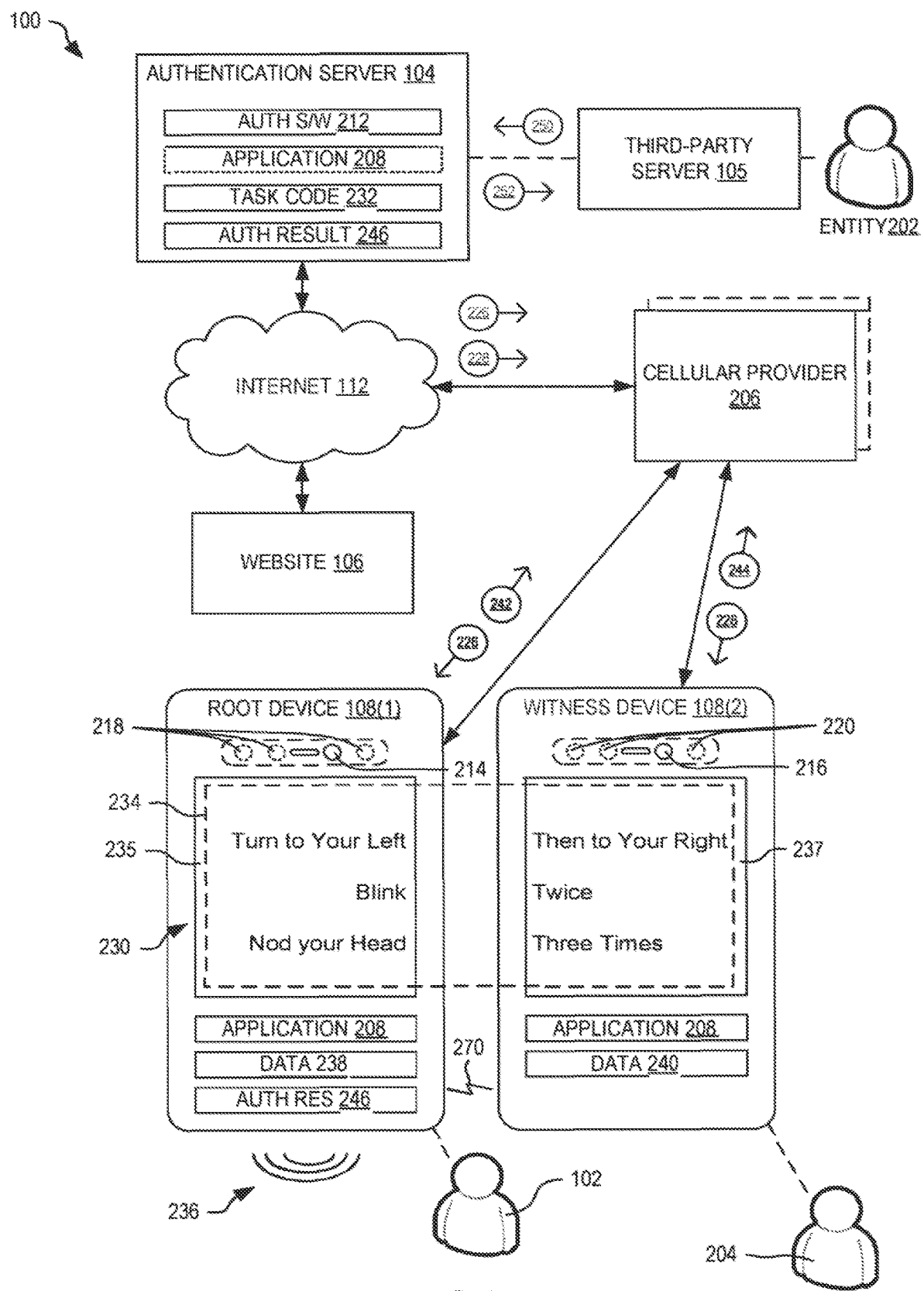
FIG. 2A illustrates a schematic block diagram showing the system of FIG. 1 in further example detail, consistent with the present inventive concepts.
Figure 2B:
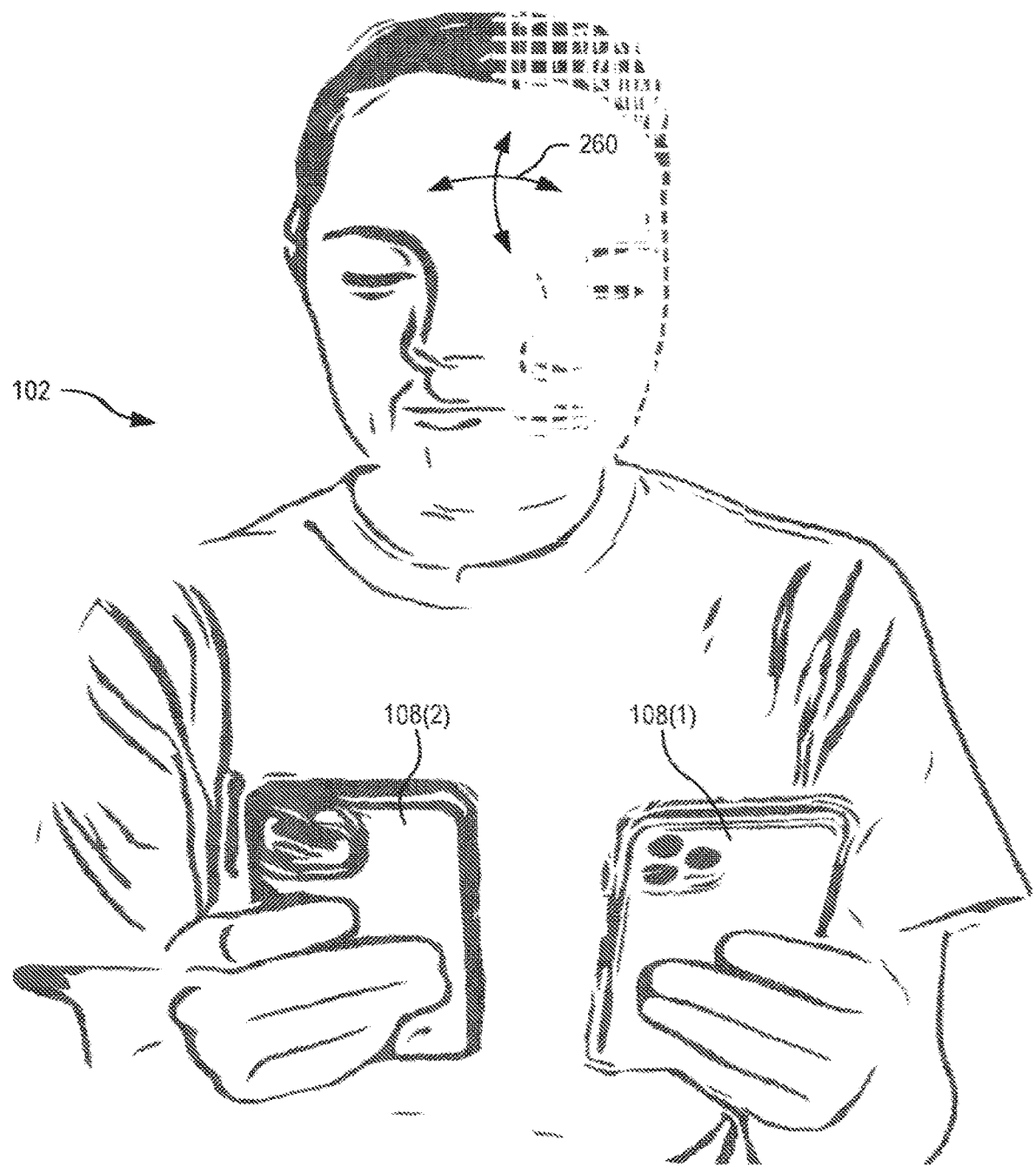
FIG. 2B illustrates an example head movement captured by both witness and root client devices as the user performs the interactive task of FIG. 2A, consistent with the present inventive concepts.

FIG. 1 shows one authentication witness system 100 that provides an improved level of trust when authenticating a user 102 to an authentication server 104 to access a protected resource (e.g. a financial account, a transaction, a transfer, a document, and the like) via a website 106. FIG. 2A is a schematic block diagram illustrating system 100 of FIG. 1 in further example detail. FIG. 2B is a perspective illustrating head movement as user 102 performs interactive task 230 of FIG. 2A. FIGS. 1, 2A and 2B are best viewed together in the following description.

Website 106 can be implemented by authentication server 104, or by a third-party server 105, that is accessed via the Internet 112. Internet 112 can comprise any computer network, such as a public and/or private computer network, and/or a cellular network. In some embodiments, authentication server 104 and third-party server 105 can be co-located and/or have functionality combined in a single server. In other embodiments, third-party server 105 can use authentication server 104 as a service to provide a higher level of authentication of user 102. User 102 has a root client device 108(1) (e.g. a personal smartphone, a tablet computer, or similar device) that authenticates user 102 using a user recognition routine (e.g. a facial recognition routine) when authorizing access to that device. At the same time, user 102 uses a witness client device 108(2) (e.g. a second smartphone, tablet computer, or similar device, belonging to another person, referred to herein as a "witness"; see for example witness 204 of FIG. 2A) to witness the authentication. As shown in FIG. 1, root and witness client devices 108(1) and 108(2) are positioned adjacent one another such that the face of user 102 can be presented to each client device as shown. Root client device 108(1) and witness client device 108(2) can each run an application (e.g. an app downloaded to each client device; see for example applications 208 of FIG. 2A) that is associated with authentication server 104 and that cooperate to collect user recognition data (e.g. facial, head, eye, and/or other movement data, see for example movement data 238 and 240, FIG. 2A) of user 102 during the authentication, such as recognition data gathered in response to an interactive task (see for example interactive task 230, FIG. 2A) output by one or both of root and witness client devices 108(1) and 108(2). Movement data (e.g. facial movement data) and/or other recognition data can be independently received by authentication server 104 from both of root client device 108(1) and witness client device 108(2), and authentication server 104 can compare the recognition data to verify that both root and witness client devices 108(1) and 108(2) were present during the authentication of user 102. The use of facial movement and/or other recognition data by authentication server 104 eliminates any possibility of fraud through subterfuge, such as spoofing, scamming, replicating, and/or other malicious attacks by a nefarious party. System 100 can also include "user liveness" tests to eliminate the use of facial replicas. For example, during authentication, application 208 can detect one or more of blood flow and/or other physiologic parameter level, eye and/or eyelid movement, expression changes, and the like, as an indication of liveness of the individual being authenticated (the "user"), thereby preventing the facial replica from successfully authenticating.

By analogy, system 100 can thus be configured to provide a service similar to a notary public, where the witness (e.g. owner of witness client device 108(2) and trusted to authentication server 104) performs additional verification (similar to the notary inspecting a driver's license or other document) of the identity of registered user 102 prior to authentication, at the request of authentication server 104. System 100 can also permit friends and/or family of registered user 102 to act as the witness and provide witness client device 108(2) to witness authentication of user 102 to authentication server 104.

Authentication server 104 and/or third-party server 105 can be operated by an entity 202 that manages accounts for each of user 102 and witness 204, such as when an improved level of trust in authentication of user 102 is required or at least desired. Entity 202 can be, for example, a bank, an accountancy, a government organization, a document management company, and the like. In some embodiments, where authentication server 104 is independent of third-party server 105, authentication server 104 can provide an authentication service at a higher level of trust to entity 202. Functionality of authentication server 104 can alternatively be integrated with third-party server 105.

In FIG. 2A, when third-party server 105 requires a higher level of trust for authentication of user 102, third-party server 105 can send a request 250 to authentication server 104; authentication server 104 in turn determines that a higher level of trust is needed to authenticate user 102 upon receipt of request 250. In some embodiments, such as when authentication server 104 and third-party server 105 are integrated together, authentication server 104 can determine that a higher level of trust is needed to authenticate user 102 based upon context of the access or service being requested by user 102.

Authentication server 104 can comprise a server that is "in the cloud" and communicate with root and witness client devices 108(1) and 108(2) via the Internet 112. Root and witness client devices 108(1) and 108(2) can also be configured to communicate independently with authentication server 104, such as via a cellular provider 206 and/or the Internet 112. Root and witness client devices 108(1) and 108(2) can use the same cellular provider 206 or different cellular providers without departing from the scope hereof. Importantly, communication between authentication server 104 and each of root and witness client devices 108(1) and 108(2) can occur independently of website 106: advantageously, this prevents any nefarious party who may attempt access to website 106 from detecting and interpreting communication between authentication server 104 and each of root and witness client devices 108(1) and 108(2).

Root and witness client devices 108(1) and 108(2) can each represent a smartphone, tablet computer, and/or similar device that is configured to implement facial recognition as a way of access control. Root client device 108(1) can be associated with (e.g. owned and/or operated by) user 102, and witness client device 108(2) can be associated with (e.g. owned and/or operated by) witness 204. Accordingly, root and witness client devices 108(1) and 108(2) can each include at least one forward camera 214 and 216, and one or more infrared projector/scanner 218 and 220, respectively. Infrared projector/scanner 218 and 220 can be configured to operate to capture depth information of a face presented to cameras 214, 216. For example, first, a flood of infrared light shines onto the face of user 102 and an infrared image is captured. Then, multiple (e.g. more than 30,000) pin-points of infrared light are projected onto the face, and the infrared sensors capture a depth field (3D data) of the face based upon detection of infrared light reflected from the face. The infrared image and the depth field are then used together to authenticate the face to the client device based upon previous training of the facial detection, such as without storing facial images on the client device, and without sending facial images over a network (e.g. the Internet) to a server or other memory storage device. Each root and witness client device 108(1) and 108(2) makes this IR scanning and authentication functionality available to an application running on the client device. Further, the 3D facial data and images allow facial expressions (e.g. blinking, winking, smiling, yawning, and the like), eye and/or eyelid movement, mouth movement, facial muscle movement, and/or head movement (e.g. turning left and right, nodding, and the like) to be detected. In some embodiments, motion of one or more other body parts of the user are imaged and data collected for user authentication. Advantageously, this 3D detection and authentication functionality is part of each root and witness client devices 108(1) and 108(2) and is used by application 208 on both root and witness client devices 108(1) and 108(2) to authenticate, and/or capture movement of, user 102, such as when performing a randomly selected and/or generated interactive task 230.

Interactive task 230 can be a randomly selected task (e.g. challenge) for user 102 to perform as part of authentication, and can require user 102 to make predefined movements (e.g. facial movements) that are detectable by both root and witness client devices 108(1) and 108(2). Interactive task 230 can comprise a game, a maze puzzle, a sequence of on-screen facial movement directives, a sequence of audible facial movement directives, a series of consecutive non-repeating single digit numbers randomly distributed across displays of both the root and the witness client devices, and/or other user performable tasks. In some embodiments, interactive task 230 comprises two or more tasks (e.g. two of more of those listed immediately hereinabove). Interactive task 230 can require user 102 to make movements (e.g. eye and/or eyelid movements, mouth movements, facial muscle movements, other facial movements, head movements, finger movements, hand movements, arm movements, and/or other body part movements) such as to control a cursor (see for example cursor 404 in FIG. 4) to complete interactive task 230. Interactive task 230 need not control a cursor though; it can simply direct the user (e.g. direct attention, such as eye gaze or head position, of the user) between client devices 108(1), 108(2). As shown in FIG. 2B, for example, user 102 may turn their head, as indicated by arrows 260, when performing interactive task 230, and each of root and witness client devices 108(1) and 108(2) can independently track and capture movement of user 102 as movement data 238 and 240, respectively. Movement data 238 and/or 240 can comprise one or more forms of user 102 movement, such as movement selected from the group consisting of: head movement; eye and/or eyelid movement; mouth movement; lip movement; tongue movement; ear movement; facial muscle movement; arm movement; hand movement; finger movement; limb movement; other body part movement; and combinations of these. In another example, user 102 uses body part movement (e.g. head movement and/or head position, eye movement, hand movement, and the like) to control a cursor that pushes an object between displays 235 and 237 of root and witness client devices 108(1) and 108(2). To implement interactive task 230, root and witness client devices 108(1) and 108(2) can cooperate, such as by using wireless connectivity 270 (e.g. one or more of Wi-Fi, Bluetooth, near-field, and the like) to coordinate movements of a cursor and/or objects between displays 235 and 237.

Authentication server 104 comprises, for example, a computer that includes at least one processor and memory that stores authentication software 212 as machine readable instructions that, when executed by the processor, causes the processor to perform one or more routines and/or algorithms ("routines" or "algorithms" herein), such as a routine that performs witness authentication of user 102. Authentication server 104 can be associated with an application 208 that can be downloaded to and executed by each of root and witness client devices 108(1) and 108(2). For example, to avail themselves of the advanced security provided by system 100, authentication server 104 can instruct user 102 and witness 204 to download and install application 208 to root and/or witness client devices 108(1) and 108(2), respectively. Application 208, once installed, can register itself, and thus the client device on which it is installed, with authentication server 104, where it can be associated with a corresponding account. For example, root client device 108(1) is associated with an account of user 102 and witness client device 108(2) is associated with an account of witness 204. Accordingly, authentication software 212 can look up each of root and witness client devices 108(1) and 108(2) from the accounts stored in a database when its user attempts to log in to website 106 and provide a login name and/or an account ID.

Authentication software 212 can be configured to open a communication channel with each of root and witness client devices 108(1) and 108(2). For example, authentication software 212 can send messages 226 and 228 (e.g. notifications) to root and witness client devices 108(1) and 108(2), respectively, that cause each client device to start application 208 when it is not already running. Message 226 instructs application 208 running on root client device 108(1) that it is to be configured as the root client device, and message 228 instructs application 208 running on witness client device 108(2) that it is to be configured as the witness client device. Accordingly, although root and witness client devices 108(1) and 108(2) each run the same application 208, application 208 configures its behavior according to the received message 226, 228. Message 226 can identify (e.g. a MAC address) witness client device 108(2) and message 228 can identify (e.g. a MAC address) root client device 108(1), such that application 208 can cause root and witness client devices 108(1) and 108(2) to communicate and synchronize with one another. Messages 226 and 228 can also include a task code 232, such as a task code 232 that is randomly generated (e.g. by authentication server 104) and can be used by each application 208 to determine interactive task 230 that is to be performed by user 102. Task code 232 can be a random number and/or a random seed that is used by application 208 to determine one or both of a type of interactive task and/or a content of the interactive task. Particularly, task code 232 can be configured to allow authentication software 212 to know which of many different and/or varied interactive tasks (e.g. interactive task 230) is to be performed by user 102, and interactive task 230 is configured such that it cannot be predicted, for example since task code 232 is unpredictably and randomly generated and/or part of a pseudo-random sequence known only to authentication software 212. Further, task code 232 can be delivered directly to each of root and witness client devices 108(1) and 108(2), and, for example, not via website 106; thus, a nefarious party attempting to use website 106 maliciously cannot easily intercept task code 232. Application 208 can be periodically updated to interpret task code 232 differently from a previous version, such that even if task code 232 were intercepted, its meaning and interpretation changes over time, making it even less predictable. In some embodiments, task code 232 changes over time. In some embodiments, task code 232 defines randomness in the content of interactive task 230, but the type of interactive task 230 is randomly selected by application 208 running on one of root and witness client devices 108(1) and 108(2), sent to the other client device 108, and sent to authentication server 104 with movement data 238 and 240 and/or authentication result 246 (e.g. in one of messages 242 and 244). Accordingly, authentication server 104 can be configured to determine expected movement (e.g. expected movement 728 of FIG. 7) of user 102 when performing interactive task 230. Alternatively, task code 232 may only define the type of interactive task 230, and one of root and witness client devices 108(1) and 108(2) can be configured to randomly generate the content of interactive task 230 and inform the authentication server 104 thereof.

On witness client device 108(2), application 208 can be configured to require witness 204 to authenticate and verify that witness 204 is present. That is, witness 204 can authenticate on witness client device 108(2), such as by presenting their face to the forward-facing camera 216 of witness client device 108(2), and/or by another identification routine such as are described herein. If the authentication of witness 204 on witness client device 108(2) fails, application 208 can terminate. If authentication of witness 204 is successful, application 208 outputs directions from witness client device 108(2) that it should be handed to user 102. On root client device 108(1), application 208 can output directions that user 102 should request witness client device 108(2) from witness 204. User 102 then holds root and witness client devices 108(1) and 108(2) adjacent to one another as shown in FIG. 1.

Application 208 controls each of root and witness client devices 108(1) and 108(2) to communicate and cooperate with one another. For example, root and witness client devices 108(1) and 108(2) can each enable a wireless protocol (e.g. a Bluetooth wireless protocol) to form a communication channel. In another example, where root and witness client devices 108(1) and 108(2) are each connected to the same Wi-Fi hub, root and witness client devices 108(1) and 108(2) can form a Wi-Fi communication channel. In another example, root and witness client devices 108(1) and 108(2) can communicate via cellular provider 206, Internet 112, and/or authentication server 104. Other short-range wireless protocols can be used to enable communication between root and witness client devices 108(1) and 108(2) without departing from the scope hereof.

Root and witness client devices 108(1) and 108(2) can then cooperate to interact with user 102 and provide witnessed authentication to authentication server 104. In a first step, one or both of root and witness client devices 108(1) and 108(2) can generate interactive task 230 based upon task code 232 received in messages 226 and 228. Applications 208 can cooperate to use a virtual screen 234 formed by at least a part of each display 235 and 237 of root and witness client devices 108(1) and 108(2), respectively. Particularly, interactive task 230 can be spread across displays 235 and 237 of root and witness client devices 108(1) and 108(2), thereby requiring that both client devices are present and cooperating to allow user 102 to correctly follow interactive task 230.

In one example, as expressly shown in FIG. 2A, interactive task 230 is formed as text that instructs user 102 to perform certain tasks (illustratively shown in FIG. 2A as "Turn to your left, blink, nod your head"). These instructions can be presented on virtual screen 234 that is formed by at least part of each of the displays 235, 237 of root and witness client devices 108(1), 108(2) respectively. These lines of text can be presented one at a time. In another example of interactive task 230, the text is not displayed, but rather the instructions are output as audio 236 (e.g. read by Siri or other virtual assistant) from one or both of root and witness client devices 108(1) and 108(2). Both of root and witness client devices 108(1) and 108(2) capture user 102 movements (e.g. facial movements) as user 102 performs interactive task 230. Root client device 108(1) captures movement data 238 that defines only movements (e.g. facial movements and/or facial expressions) detected by root client device 108(1). Using the same hardware and/or software that facially authenticates user 102, movement tracker 314 (in FIG. 3) can capture movements (e.g. head movements and facial expressions) made by user 102, such as through use of the IR projector/scanner 218 and/or camera 216. Witness client device 108(2) captures movement data 240 that defines only movements detected by witness client device 108(2). In some embodiments, movement data 238 and 240 do not contain biometric images and/or other sensitive information that can be used to identify user 102 (e.g. data that can be used to identify user 102 can be removed from movement data 238 and 240). Further, at one or more times (e.g. at the beginning, midway through, and/or at the end) during capture of movement data 238 and 240, while user 102 responds to interactive task 230, application 208 can cause root client device 108(1) to authenticate user 102 using a user recognition routine (e.g. a facial recognition routine and/or a physiologic parameter recognition routine).

When interactive task 230 is complete, root client device 108(1) can be configured to send a message 242 to authentication server 104 containing results of the one or more authentications (e.g. user recognition routines) performed by root client device 108(1) during interactive task 230 and movement data 238, and witness client device 108(2) can be configured to send a message 244 to authentication server 104 containing movement data 240. Authentication software 212 can process messages 242 and 244 to determine authentication results 246 that indicate whether access to website 106 (or the protected resource, transaction, transfer, document, and the like to be performed and/or delivered) is granted for user 102. First, authentication software 212 evaluates the results of authenticating user 102 during interactive task 230, received in message 242, to determine a first level of trust. Then, authentication software 212 compares movement data 238, received in message 242, to movement data 240, received in message 244, to determine whether both root and witness client devices 108(1) and 108(2) were present during the authentication and interactive task 230. For example, when both root and witness client devices 108(1) and 108(2) are facing user 102, each client device captures substantially the same movements as user 102 follows interactive task 230, and these movements defined by movement data 238 should be very similar to movements defined by movement data 240. Slight variances are expected and allowed (e.g. via an algorithm of the system) due to the slight positional and angular differences between root and witness client devices 108(1) and 108(2) relative to user 102. Authentication software 212 also compares these detected movements to expected movements corresponding to task code 232. For example, the sequence and direction of movements detected and stored within movement data 238 and 240 should be similar to expected movements defined by the interactive task 230 corresponding to task code 232. In some embodiments, certain timing differences between expected movements and the movement data 238 and 240 are ignored (e.g. via an algorithm of the system), however timing of movements between movement data 238 and movement data 240 is not ignored. Thus, a malicious "replay attack" (e.g. by a nefarious party) where previously captured messages 242 and 244 are resent to authentication server 104 will not match expected movements, since task code 232 is regenerated for each two-device authentication attempt, and thus the expected movements will not be the same. Accordingly, authentication software 212 is not fooled by replay attacks, making subterfuge significantly more difficult.

Authentication software 212 can be configured to send a message 252 to third-party server 105 indicating a result (success or failure) of a witnessed authentication of user 102, where success indicates that user 102 was successfully authenticated on root client device 108(1), the captured movement data 238 matches movement data 240 to indicate that witness client device 108(2) was present to witness the authentication, and that one or both of movement data 238 and 240 matches expected movement (see for example expected movement 728 in FIG. 7) corresponding to interactive task 230 to indicate that user 102 performed the interactive task 230. Success of all evaluations by an authentication routine of authentication software 212 indicates a higher level of trust that user 102 is who they claim to be.

Figure 3:
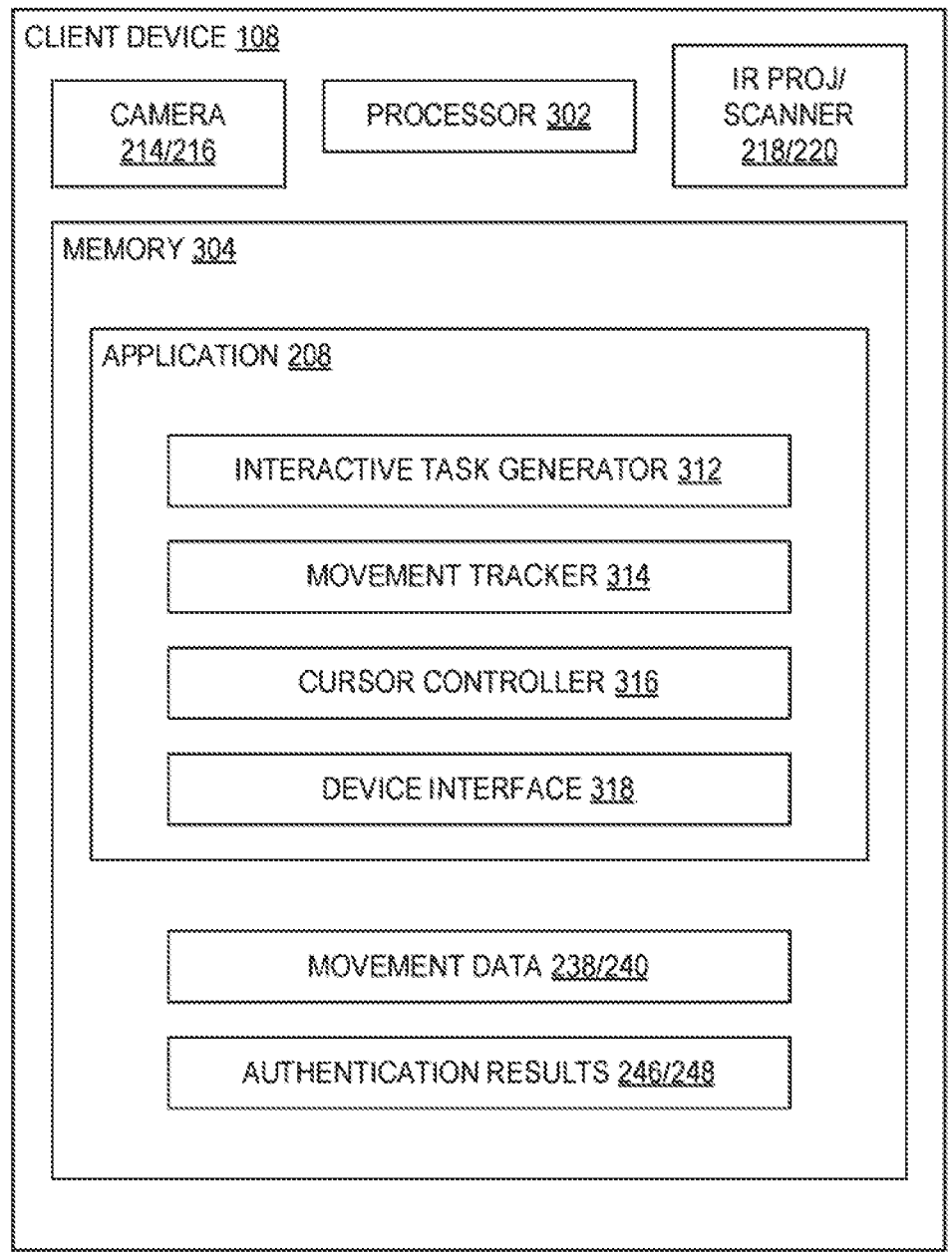
FIG. 3 illustrates a block diagram showing the application of FIG. 2A in further example detail, consistent with the present inventive concepts.

FIG. 3 is a block diagram illustrating one example client device 108. Client device 108 is an example of both root and witness client devices 108(1) and 108(2) and includes at least one processor 302 communicatively coupled with a memory 304 that stores application 208 as machine readable instructions executable by processor 302 to provide functionality of client device 108 as described herein (e.g. perform one or more algorithms or routines as described herein). In some embodiments, application 208 includes a plurality of modules including an interactive task generator 312, a movement tracker 314, a cursor controller 316, and a device interface 318. Interactive task generator 312 can be configured to implement one or more algorithms and/or routines that cooperate to generate interactive task 230 based upon task code 232 received via one of messages 226 and 228 from authentication server 104. Interactive task generator 312 generates interactive task 230 from the perspective of one of the root client device or the witness client device, such as when the corresponding part of interactive task 230 for virtual screen 234 is generated. Movement tracker 314 captures interactive movement data 238/240, according to whether application 208 is running as the root or witness.

Cursor controller 316 detects movement of user 102 to control movement of a cursor (e.g. see cursor 404, FIG. 4), and/or any object, on virtual screen 234. For example, cursor controller 316, when running on root client device 108(1), controls movement of the cursor or other object ("cursor" herein) on root client device 108(1), and when running on witness client device 108(2), controls movement of a cursor on witness client device 108(2). In some embodiments, cursor controller 316 detects a head-position and/or eye position of user 102, relative to client device 108 to control movement of a cursor on the display of the client device. Accordingly, cursor controller 316 can determine from the head-position and/or eye position when the focus of user 102 is on the respective display 235, 237, of root and witness client devices 108(1) and 108(2). In such embodiments, cursor controller 316 can implement a head-controlled cursor solution similar to HeadGaze by eBay, where the cursor position is determined via facial tracking and head movement. eBay's HeadGaze is an open-source library released by eBay to allow developers to use facial movement recognition in applications that they develop as an alternate navigation option for users with physical disabilities, for example. In other embodiments, cursor controller 316 can implement eye-tracking where eye movements and/or eye-positions of user 102 are used to control the movements of the cursor. In these embodiments, the eye movements can also be captured by movement tracker 314. Accordingly, cursor controller 316 can determine from the eye-movement and/or eye-position when the focus of user 102 is on the respective display 235, 237, of root and witness client devices 108(1) and 108(2).

Device interface 318 can be configured to allow root client device 108(1) to cooperate with witness client device 108(2) during witnessed authentication and participation of user 102 in interactive task 230. Accordingly, device interface 318 allows root and witness client devices 108(1) and 108(2) to cooperate to perform the witnessed authentication of user 102. As noted above, root and witness client devices 108(1) and 108(2) can communicate via one or more of Bluetooth, Wi-Fi, and/or cellular protocols.

In some embodiments, cursor controller 316 operating on each client device 108 can cooperate, via device interface 318, to control cursor movement relative to virtual screen 234, such that the cursor can move between displays 235 and 237 of root and witness client devices 108(1) and 108(2). In other embodiments, cursor controller 316 running on each of root and witness client devices 108(1) and 108(2) independently controls the cursor when positioned on respective displays 235 and 237. For example, cursor controller 316 can detect when the head (or face) of user 102 points towards the display of that client device and thereby only controls the cursor of that display when attention of user 102 is actively directed towards that client device. When the head (or face) of user 102 is not pointing towards the display of that client device, the cursor can be hidden. Accordingly, the cursor appears to move between client devices. In yet other embodiments, cursor controller 316 can operate only on one of root and witness client devices 108(1) and 108(2) to detect movements of user 102, and can share, via device interface 318, detected movements with the other client device. However, independently of whether control of the cursor is by cursor controller 316 running on one or both of root and witness client devices 108(1) and 108(2), movement tracker 314 on each of root and witness client devices 108(1) and 108(2) can independently capture movement data 238/240. Accordingly, movement data 238/240 includes movements of user 102 throughout participation in interactive task 230 from the perspective of the respective one of root and witness client devices 108(1) and 108(2).

Although root client device 108(1) is illustrated on the left of witness client device 108(2) in FIGS. 1, 2A and 2B, positioning of root and witness client devices 108(1) and 108(2) can be reversed (e.g. root client device 108(1) can be on the right of witness client device 108(2)). Device interface 318, running on each of root and witness client devices 108(1) and 108(2) can determine which protocols are available and best suited for intra-device communication. Device interface 318 can then allow application 208, through use of movement tracker 314 and/or cursor controller 316 on each of root and witness client devices 108(1) and 108(2) to synchronize with each other to perform the witnessed authentication.

Figure 4:
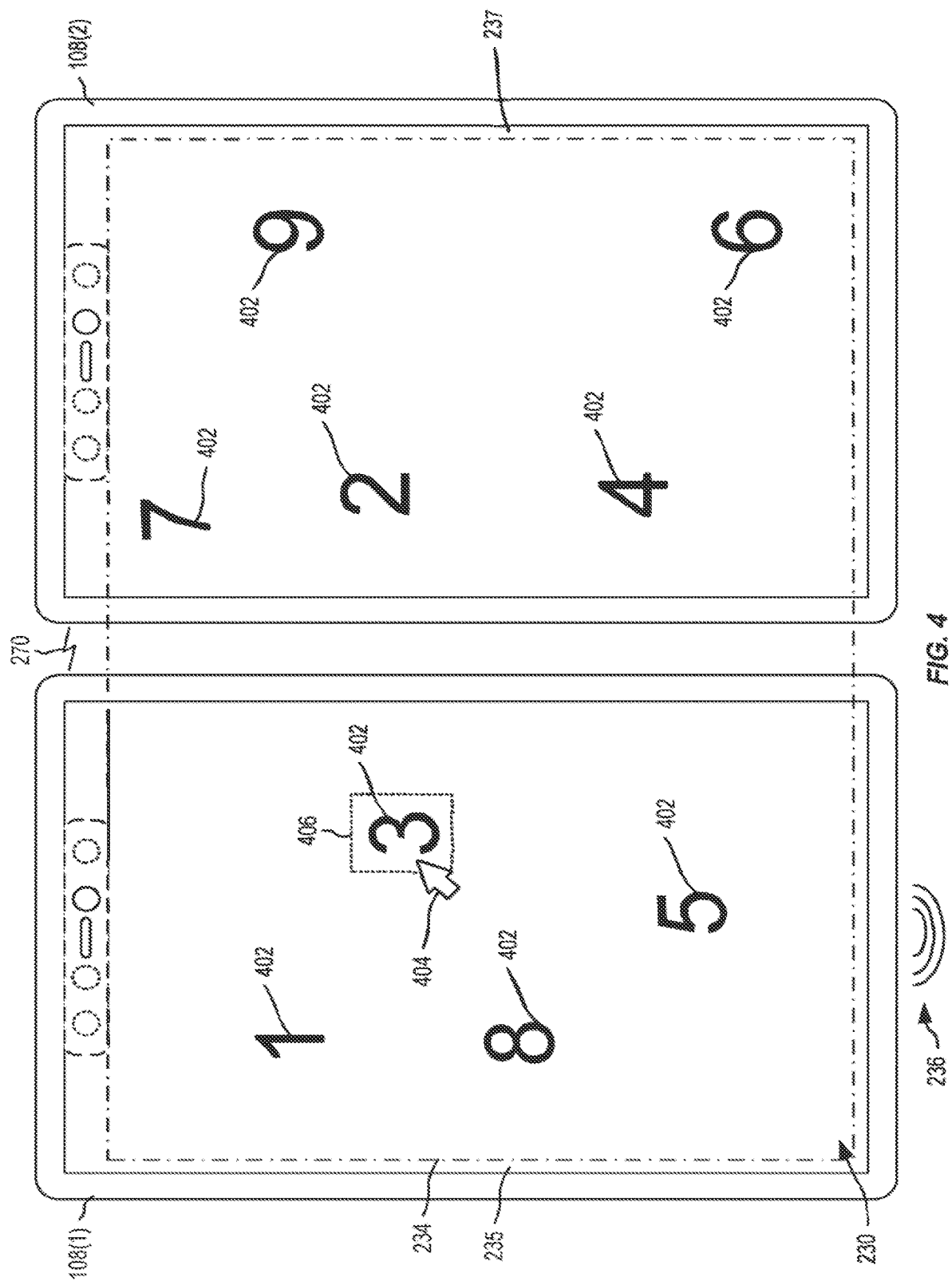
FIGS. 4, 5, and 6 illustrate three different example types of the interactive task of FIG. 2A, consistent with the present inventive concepts.
Figure 5:
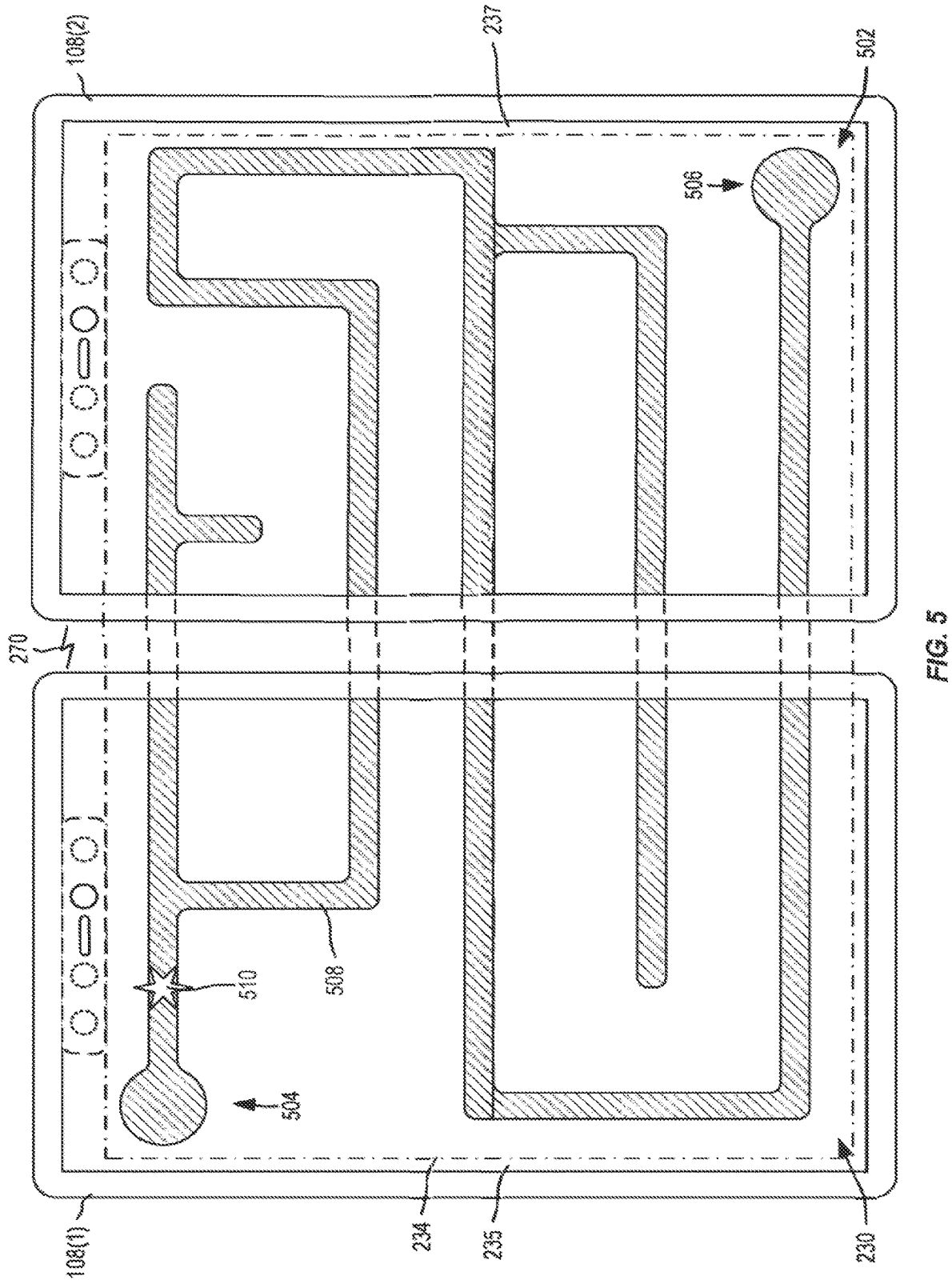
Figure 6:
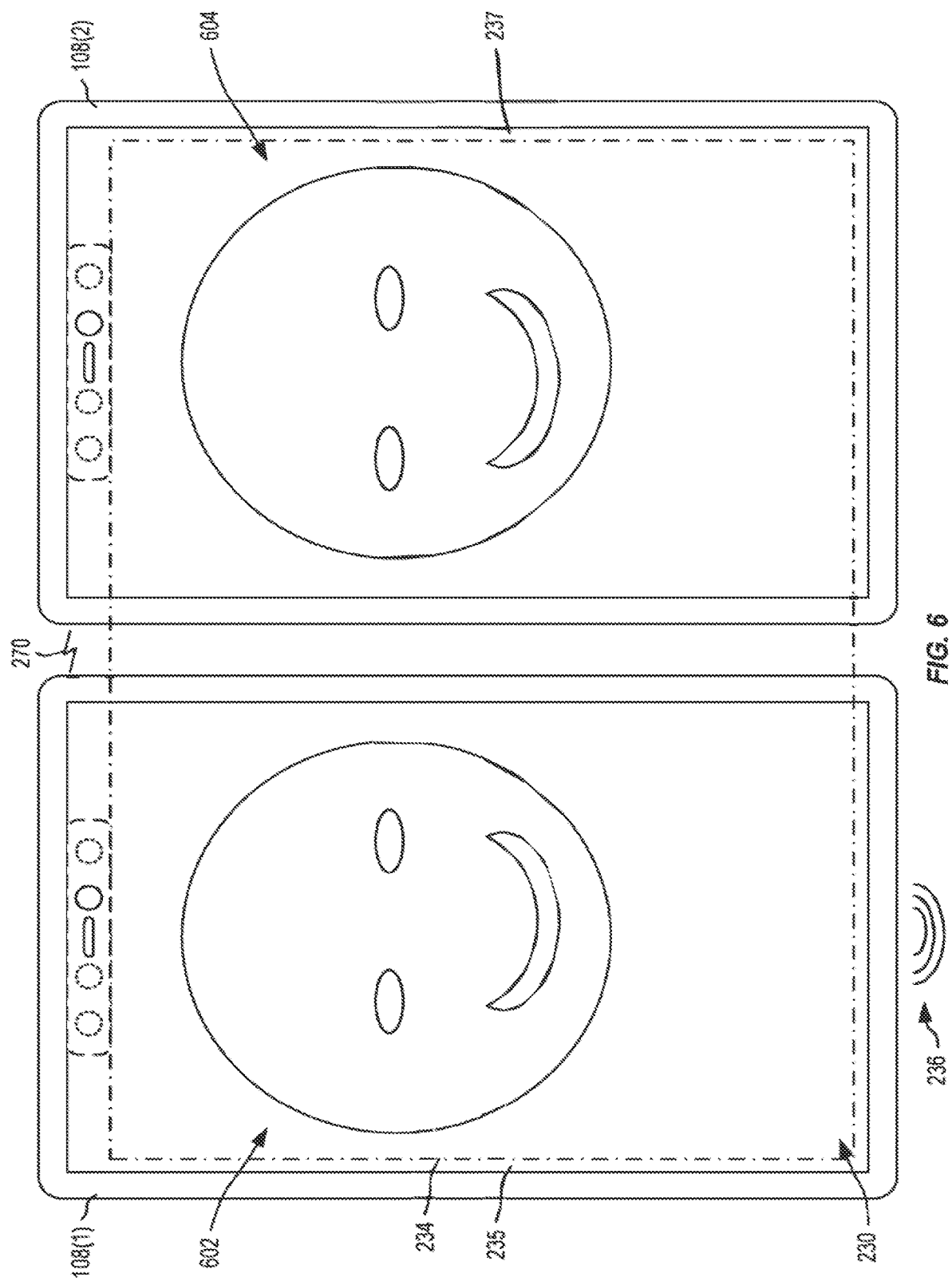

FIGS. 4, 5, and 6 show three different example types of interactive task 230 that can be generated from task code 232 by application 208 running on both root and witness client devices 108(1) and 108(2). In the example of FIG. 4, interactive task 230 is a "number selection" type of task where information (e.g. audio information, audio 236 shown), generated by interactive task generator 312 from task code 232, is output by application 208 to direct user 102 to move a cursor 404, using head, eye, and/or other movements detected by cursor controller 316, to highlight one or more numbers (e.g. and/or other selectable icons) included in the information provided (e.g. announced in audio 236). Interactive task generator 312 uses task code 232 to determine a location for each of a plurality of numbers 402 across virtual screen 234. Accordingly, certain numbers in the sequence are shown on display 235 of root client device 108(1) and other numbers of the sequence are shown on display 237 of witness client device 108(2). In this example, user 102 is required to move cursor 404 between displays 235 and 237 to select the provided numbers. User 102 can be instructed (e.g. via audio 236 or otherwise) to interactively select at least two of the numbers shown on displays 235 and 237 in ascending numerical order by moving their head to control cursor 404. As cursor 404 is near one of the numbers, it can be highlighted, for example as indicated by dashed box 406, and the number is selected, such as by the user 102 keeping the number highlighted for a predefined number of seconds (e.g. between 1 and 5 seconds). This cursor control and number selection requires no conventional selection using a finger or stylus. The instructions for which numbers to select and in which order can be generated from task code 232, or can be provided separately from authentication server 104. In an alternative embodiment, different symbols, shapes, and/or colors can be used in place of numbers.

FIG. 5 shows an example maze type of interactive task 230 that can be generated by interactive task generator 312 from task code 232. In this example, virtual screen 234 presents a maze 502, spread across both displays 235 and 237, with a start 504 and an end 506, and at least one path 508 connecting them together. User 102, using head, eye, and/or other movements, controls a cursor 510 to follow path 508 from start 504 to end 506. Movement and/or facial expressions of user 102 can be independently captured by movement tracker 314 in each of root and witness client devices 108(1) and 108(2) to create movement data 238 and 240, respectively, as user 102 performs interactive task 230. In another example, interactive task 230 is a game that user 102 plays using head, eye, and/or other movements. For example, interactive task 230 could be a game similar to one or more of the arcade games "pong," "breakout," "space invaders", and/or "missile command", where head, eye, and/or other movement of user 102 controls movement of one or more paddles or blasters between displays 235 and 237 to play the game.

FIG. 6 shows another example interactive task 230 that can be generated by interactive task generator 312 from task code 232, where user 102 follows instructions (e.g. provided in audio 236) to make facial expressions that are captured by movement tracker 314. These instructions can be generated from task code 232, or can be received separately from authentication server 104. This example is similar to the example of FIG. 2A, except that instructions for user 102 to follow are output as audio 236 and each of root and witness client devices 108(1) and 108(2) displays an animated avatar 602 and 604 generated from the captured movements, and stored as movement data 238 and 240, respectively. Since cameras 214, 216 and IR projector/scanner 218, 220 of root and witness client devices 108(1) and 108(2) have slightly different perspectives of user 102, avatars 602 and 604 will be similar to each other, but not exactly the same.

Figure 7:
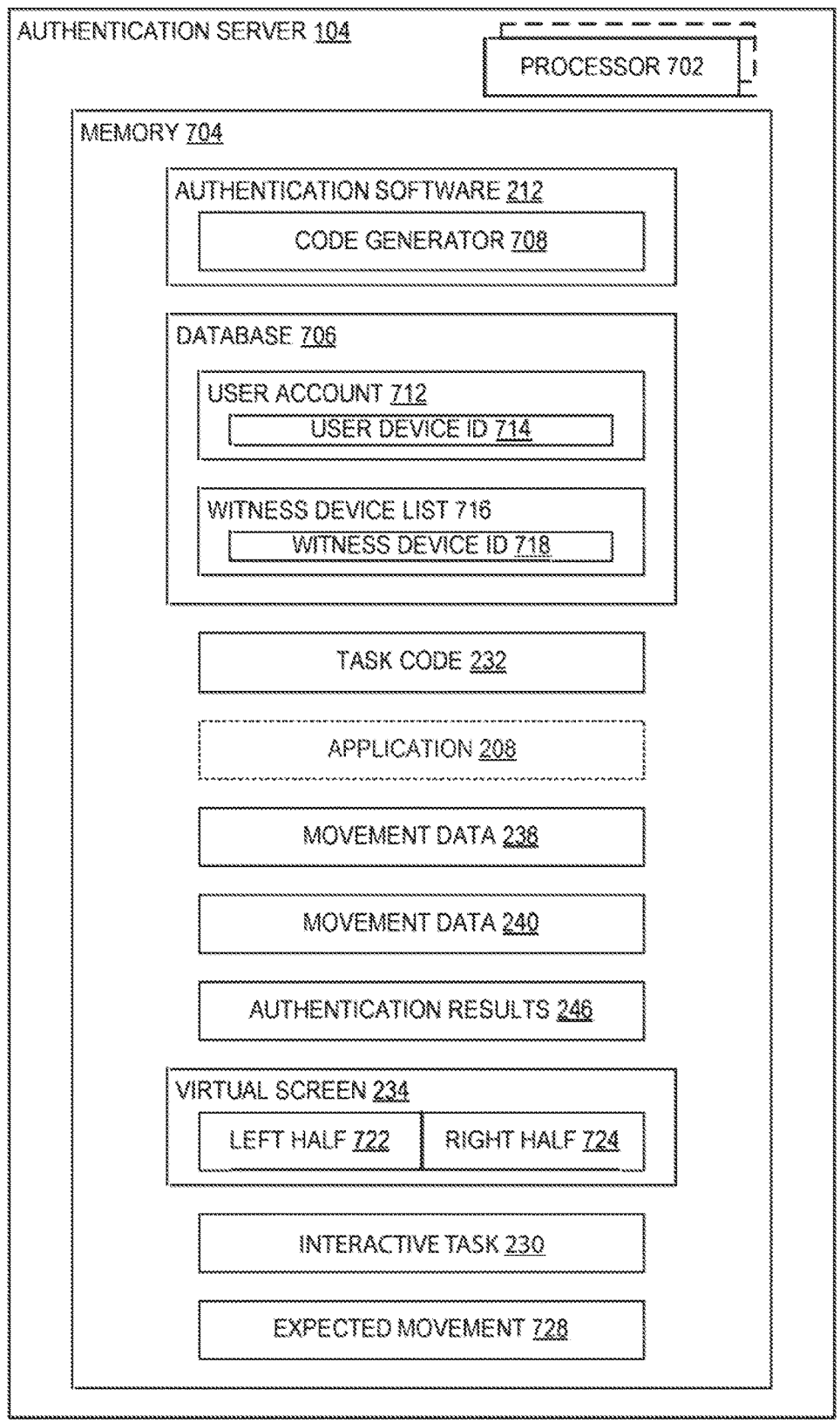
FIG. 7 illustrates a high-level block diagram showing the authentication server of FIGS. 1 and 2A in further example detail, consistent with the present inventive concepts.

FIG. 7 is a high-level block diagram illustrating authentication server 104 of FIGS. 1 and 2A in further example detail. Authentication server 104 includes at least one processor 702 communicatively coupled with memory 704 that includes authentication software 212, implemented as machine readable instructions executable by the at least one processor 702, and a database 706. Database 706 can store a user account 712 that can include login details (e.g. a username and/or account number) of user 102 and an associated user client device identification (ID) 714 that includes an address (e.g. a MAC address, a URL, a telephone number, and/or other connectivity details) of root client device 108(1). Database 706 can also store a witness client device list 716 that includes a witness client device identification 718 that identifies one or more client devices 108 that, such as through prior agreement, act as witness to any needed authentication. In some embodiments, witness client device list 716 can be part of user account 712, whereby witness client device ID 718 identifies witness client device 108(2) when witness 204 has previously agreed to (e.g. been configured to) be a witness specifically for user 102. In another example, root client device 108(1) can send witness client device ID 718 to authentication server 104. For example, user 102 can ask a friend or colleague to witness the authentication. Witness client device ID 718 can include an address (e.g. a MAC address, a URL, a telephone number, and/or other connectivity details) of witness client device 108(2). Accordingly, authentication software 212 can independently identify root client device 108(1) and witness client device 108(2) based upon details of user 102 (e.g. username and/or account number). In some embodiments, authentication software 212 can select witness client device ID 718 from witness client device list 716, based upon one or more criteria, such as a level of trust in witness 204, a current location of root client device 108(1), a current location of witness client device 108(2), where the location of root client device 108(1) and/or witness client device 108(2) is determined by one or more of GPS (such as at the same locale), by same local network connection (e.g. same Wi-Fi), and the like. In another example, user 102 selects witness client device 108(2) through proximity, whereby application 208 running on root client device 108(1) uses near-field wireless communication to receive witness client device ID 718 from witness client device 108(2) and sends witness client device ID 718 to authentication software 212.

Authentication software 212 can include a code generator 708 that is invoked when a request to authenticate user 102 is received. In some embodiments, code generator 708 generates task code 232 such that interactive task 230 (e.g. instructions to perform task 230) appears to user 102 to have been randomly generated. In some embodiments, task code 232 is a pseudo-random number. In other embodiments, task code 232 is formed of more than one pseudo-random number, such as where a first part of task code 232 defines a type of interactive task 230 and where a second part of task code 232 defines content for that type of interactive task 230. Accordingly, code generator 708 generates task code 232 such that interactive task 230 at least appears to be selected at random. For example, code generator 708 generates virtual screen 234 and user instructions for interactive task 230 corresponding to task code 232. Virtual screen 234 can comprise left half 722 and/or right half 724 as shown. In some embodiments, root client device 108(1) comprises left half 722 and witness client device 108(2) comprises right half 724, such as when root client device 108(1) is positioned to the left of witness client device 108(2), and vice versa. Code generator 708 can then generate an expected movement 728, based on virtual screen 234 and the instructions for example, that predicts movement of user 102 when performing interactive task 230. That is, expected movement 728 defines a movement pattern to which movement data 238 and 240 is expected to conform to when user 102 performs interactive task 230. For example, where interactive task 230 uses numbers 402 and head-based movement of cursor 404, as shown in FIG. 4, expected movement 728 can define expected head, eye, and/or other movements of user 102 to control cursor 404 to select numbers 402 based upon the generated position of numbers across virtual screen 234 and the generated order of number selection. Since interactive task 230 is generated at random, code generator 708 can use an intelligent algorithm (e.g. machine learning, neural net, and/or other AI algorithm) to generate expected movement 728 based on task code 232. For example, based upon a sample of captured movements of a plurality of test subjects performing randomly generated interactive tasks, code generator 708 uses the gained knowledge of captured head, eye, and/or other body part movement and cursor control to predict expected movement 728 for any future task code 232.

In some embodiments, where authentication server 104 provides witnessed authentication as a service to third-party server 105, authentication software 212 can receive a request to authenticate user 102 at a higher level from third-party server 105, or from a website 106 thereof. In other embodiments, where authentication server 104 and third-party server 105 are integrated, authentication software 212 can determine, based upon the requested access to user account 712 and/or the transaction request that user 102 has requested, that a higher level of authentication of user 102 is required. For both embodiments, authentication software 212 can initiate authentication of user 102 by invoking code generator 708 to generate task code 232, and looking up user 102 in database 706 to identify root and witness client devices 108(1) and 108(2) based upon user client device ID 714 and witness client device ID 718, respectively.

Authentication software 212 can be configured to then send messages 226 and 228, each including task code 232, to root and witness client devices 108(1) and 108(2), respectively, such that application 208 runs on each of root and witness client devices 108(1) and 108(2). In response, authentication software 212 receives message 242 containing authentication results 246 and movement data 238 from root client device 108(1), and receives message 244 containing movement data 240 from witness client device 108(2). Authentication software 212 can then determine whether authentication results 246 indicate that the facial authentication of user 102 on root client device 108(1) was successful, compare movement data 238 to movement data 240 to determine whether the authentication was successfully witnessed, and then determine whether interactive task 230 was performed correctly by comparing one or both of movement data 238 and movement data 240 to expected movement 728. Accordingly, authentication software 212 verifies that user 102 authenticated successfully to root client device 108(1), that witness client device 108(2) was present and witnessed the authentication, and that the performance of interactive task 230 by user 102 was for the current interactive task 230 (e.g. was not a replay of a recording of a previous interactive task).

Authentication software 212 can use and/or include one or more algorithms to evaluate movement 238 and 240 against expected movement 728. For example, one algorithm can filter movement data 238 and/or 240 to determine an average head and/or other body part movement of user 102 for comparison to expected movement 728. In another example, authentication software 212 includes an AI algorithm that evaluates characteristics of head, eye, and/or other body part movement in movement data 238 and/or 240 against previous captured movement characteristics of user 102 and the algorithm can be configured to identify anomalies when characteristics do not match. For example, if user 102 has a nervous twitch, tremor, and/or a head slant as a previous noted (e.g. and recorded) characteristic that is absent in movement data 238 and/or 240, authentication software 212 can determine that user 102 is not who they claimed to be and authentication can be denied. In another example, authentication software 212 can evaluate a speed at which user 102 responds to prompts and/or other stimuli, and compare those response time characteristics to previously captured characteristics. Accordingly, successful authentication of user 102 has a higher level of trust as compared to conventional single device authentication. Numerous forms of user characteristics can be utilized (e.g. recorded and compared to a previous recording or other standard) by authentication software 212 in one or more authentication routines.

Authentication software 212 affords a level of trust to authentication of user 102 to root client device 108(1), and increases the level of trust in view of trust in witness client device 108(2). That is, since it is less likely that both root and witness client devices 108(1) and 108(2) are simultaneously compromised, by using both client devices trust in the authentication is increased above the trust of a single client device. Particularly, based upon the selection of witness client device 108(2), higher levels of trust can be achieved. For example, a higher level of trust in authentication can be achieved when witness client device 108(2) and witness 204 are selected with a known higher level of trust, such as when witness 204 is a bank manager or other known-to-be trusted person or position, as opposed to a witness 204 simply selected as a nearest person. In certain circumstances, a higher level of trust is achieved when user 102 is known to witness 204, since witness 204 would know when user 102 is an imposter. When user 102 is not known to witness 204, witness 204 is unable to guarantee that user 102 is who is claimed to be, such as when a SIM exchange has occurred within root client device 108(1). On the other hand, where witness 204 is confirmed as belonging to a trusted organization (e.g. Uber, UPS, FedEx, and any company/organization that registers and tracks a smartphone and/or computer of the user on the company's database) or is a notary, or someone from a legal office, or someone at hotel reception, for example, authentication server 104 can have more trust in witness 204, and therefore can have more trust in the witnessed authentication of user 102 by witness 204, even though user 102 is not known to witness 204. Such witnessed authentication where user 102 is unknown to witness 204 can occur more frequently when user 102 is traveling, for example.

In some embodiments, authentication server 104 can also store, and make available for download, a copy of application 208. In other embodiments, application 208 can be made available for download from other servers (e.g. App stores, and the like).

Figure 8:
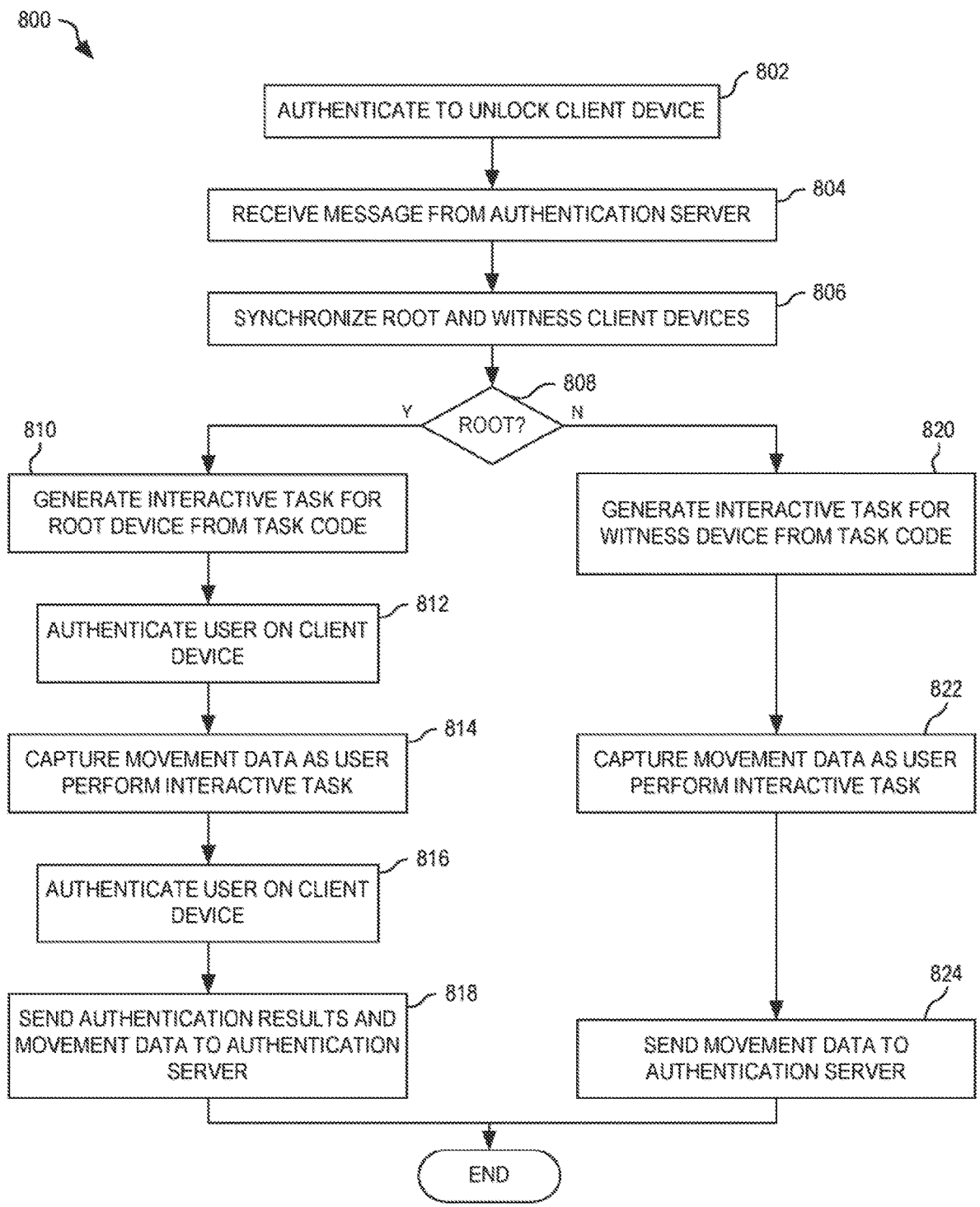
FIG. 8 illustrates a flowchart showing one example method for witnessed authentication of a user by the client devices of FIG. 1, consistent with the present inventive concepts.

FIG. 8 is a flowchart illustrating one example method 800 of witnessing authentication of a user. Method 800 is for example implemented in application 208 to run on each of root and witness client devices 108(1) and 108(2). In block 802, method 800 authenticates to unlock the client device. In one example of block 802, application 208 authenticates user 102 to unlock root client device 108(1). In another example of block 802, application 208 authenticates witness 204 to unlock witness client device 108(2). In block 804, method 800 receives a message from an authentication server. In one example of block 804, application 208, running in root client device 108(1), receives message 226 from authentication server 104. In another example of block 804, application 208, running in witness client device 108(2), receives message 228 from authentication server 104. Messages 226 and 228 can indicate upon which of the root and witness client devices the application 208 is running.

In block 806, method 800 synchronizes root and witness client devices. In one example of block 806, device interface 318 of application 208 in root client device 108(1) communicates with device interface 318 of application 208 in witness client device 108(2) to synchronize operation of application 208 between both root and witness client devices 108(1) and 108(2). Although shown as block 806, this synchronization can occur more often throughout method 800 to maintain synchronization between root and witness client devices 108(1) and 108(2), particularly as user 102 performs interactive task 230.

In block 808 a decision is made. If, in block 808, method 800 determines that it is operating in the root client device, as indicated in the received message, method 800 continues with block 810; otherwise method 800 continues with block 820. Accordingly, block 810 through 818 are performed in root client device 108(1) and block 820 through 824 are performed in witness client device 108(2).

For Root Client Device: In block 810, method 800 generates interactive task for the root client device from the task code. In one example of block 810, interactive task generator 312 is invoked to generate interactive task 230 from the perspective of root client device 108(1), whereby the corresponding portion of virtual screen 234 is generated. In block 812, method 800 authenticates the user. In one example of block 812, application 208 invokes root client device 108(1) to perform an authentication (e.g. a facial, physiologic, and/or other authentication) of user 102 and stores the result (e.g. success or failure) in authentication results 246. In block 814, method 800 captures movement data as the user performs the interactive task. In one example of block 814, movement tracker 314 captures movement data 238 as user 102 performs interactive task 230. In block 816, method 800 authenticates the user on the client device. In one example of block 816, application 208 invokes root client device 108(1) to perform an authentication (e.g. a facial, physiologic, and/or other authentication) of user 102 and stores the result (e.g. success or failure) in authentication results 246. In block 818, method 800 sends the authentication results and movement data to the authentication server. In one example of block 818, application 208 sends message 242 containing authentication results 246 and movement data 238 to authentication server 104. Method 800 then terminates.

Method 800 is shown authenticating user 102 twice on root client device 108(1), prior to starting the interactive task 230, and after completing interactive task 230. However, method 800 can authenticate user 102 at other times without departing from the scope hereof. For example, method 800 can authenticate user 102 at randomly selected times during interactive task 230.

For Witness Client Device: In block 820, method 800 generates the interactive task for the witness client device from the task code. In one example of block 820, interactive task generator 312 is invoked to generate interactive task 230 from the perspective of witness client device 108(2), whereby the corresponding portion of virtual screen 234 is generated. In block 822, method 800 captures movement data as the user performs the interactive task. In one example of block 822, movement tracker 314 captures movement data 240 as user 102 performs interactive task 230. In block 824, method 800 sends the authentication results and movement data to the authentication server. In one example of block 824, application 208 sends message 244 containing movement data 240 to authentication server 104. Method 800 then terminates.

Figure 9:
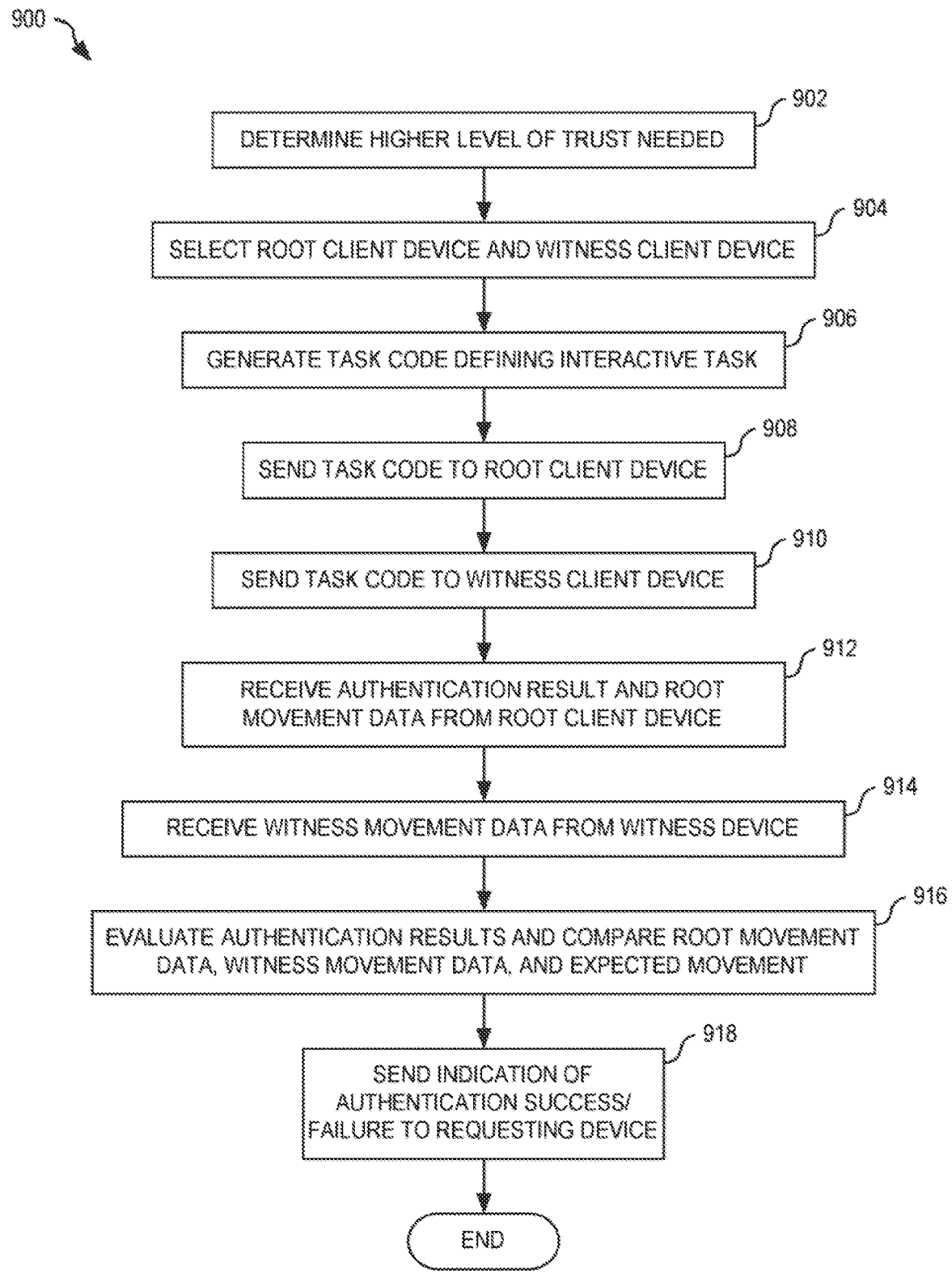
FIG. 9 illustrates a flowchart showing one example method for witnessed authentication of a user by the authentication server of FIG. 1, consistent with the present inventive concepts.

FIG. 9 is a flowchart illustrating one example authentication witness method 900 for witnessing authentication of a user to provide an improved level of trust. Method 900 is implemented in authentication software 212 of authentication server 104, for example. In block 902, method 900 determines that a higher level of trust is needed. In one example of block 902, authentication software 212 receives request 250 that indicates that a higher level of trust in authentication of user 102 is required. In block 904, method 900 selects a root client device and a witness client device. In one example of block 904, authentication software 212 determines root client device 108(1) by retrieving user account 712 and user client device ID 714 from database 706 based upon an identifier (e.g. username, account number, and the like) of user 102, and determines witness client device 108(2) from witness client device ID 718 in witness client device list 716 of database 706 based upon one or more of previous association and/or current location of client devices 108.

In block 906, method 900 generates the task code defining the interactive task. In one example of block 906, authentication software 212 invokes code generator 708 to generate task code 232 and expected movement 728 that defines movements expected to complete interactive task 230. In block 908, method 900 sends the task code to the root client device. In one example of block 908, authentication software 212 sends message 226, including task code 232 and indicating that the recipient is the root client device, to root client device 108(1). In block 910, method 900 sends the task code to the witness client device. In one example of block 910, authentication software 212 sends message 228, including task code 232 and indicating that the recipient is the witness client device, to witness client device 108(2).

In block 912, method 900 receives the authentication results and movement data from the root client device. In one example of block 912, authentication software 212 receives authentication results 246 and movement data 238 from root client device 108(1). In block 914, method 900 receives movement data from the witness client device. In one example of block 912, authentication software 212 receives movement data 240 from witness client device 108(2).

In block 916, method 900 evaluates authentication results and compares the root movement data (movement data recorded by the root client device), the witness movement data (movement data recorded by the witness client device), and the expected movement. In one example of block 916, authentication software 212 evaluates authentication results 246 to determine that authentication of user 102 in root client device 108(1) was successful, then compares movement data 238 to movement data 240 to determine whether the authentication was successfully witnessed, and then determines whether interactive task 230 was performed correctly by comparing one or both of movement data 238 and movement data 240 to expected movement 728.

In block 918, method 900 sends an indication of authentication success to the requesting device. In one example of block 918, authentication software 212 sends message 252 to third-party server 105 indicating success or failure of witnessed authentication of user 102.

Variations on Witnessed Authentication

The systems, devices, and methods, of the present inventive concepts can be of similar construction and arrangement as the similar components described in co-pending U.S. patent application Ser. No. 17/318,833, titled "Interactive Biometric Touch Scanner", filed May 12, 2021, and/or U.S. patent application Ser. No. 17/290,740, titled "Passwordless Authentication Systems and Methods", filed Apr. 30, 2021.

In some embodiments, interactive task 230 may be simplified. In one example, user 102 is instructed to input a code, such as a code that is randomly generated by authentication server 104 and/or third-party server 105 and provided to user 102 (e.g. displayed on website 106), into root and witness client devices 108(1) and 108(2) as at least part of interactive task 230. Using the example of FIG. 4, website 106 can display a randomly generated code, such as "1957", and ask that user 102 use head, eye, and/or other body part movement to move cursor to enter that code. Accordingly, as user 102 controls cursor 404 using head, eye, and/or other movements captured by cursor controller 316, pausing for a predetermined amount of time (e.g. two seconds) with the cursor 404 on and selecting a particular number, and thereby select numbers 402 corresponding to the code. In some embodiments, as an alternative to pausing on the particular number, a "click" function (e.g. a displayed number or other icon select function) is provided, such as a click that is generated when a particular motion (e.g. a finger snap, eye blink, and/or other body part motion) is performed by the user. Simultaneously, on each of root and witness client devices 108(1) and 108(2), movement tracker 314 captures the movements of user 102 as movement data 238 and 240, respectively. Thus, website 106 is also brought into the authentication process.

Alternatively, one of root and witness client devices 108(1) and 108(2) can display the code and the other device used to input the code using head, eye, and/or other movement, whereby both root and witness client devices 108(1) and 108(2) capture the head, eye, and/or other body part movements as movement data 238 and 240, respectively.

In some embodiments, system 100 comprises a client device 108 that is configured as a sensing device (e.g. a biometric sensing device) that combines sensing with an actuator for two-way communication between a finger on a surface and the device, such as is described in co-pending U.S. patent application Ser. No. 17/318,833, titled "Interactive Biometric Touch Scanner", filed May 12, 2021. The sensing device can also function as an actuator. A finger can be authenticated based on an image of the finger generated by the sensor and based on a response to energy delivered to the finger by the actuator. This two-way communication between the sensing device and the finger provides a more robust authentication of a person than fingerprint sensing alone. The client device 108 configured as a biometric sensing device can also captures photoplethysmography (PPG) data from the finger being presented. The client device 108 can capture one or more various forms of physiologic data from user 102, such as physiologic data present currently that can be compared to previously generated and/or otherwise recorded physiologic information of user 102 in an authentication routine.

In some embodiments, cameras 214 and 216, infrared projector/scanner 218 and 220, and/or another data capture device of root and/or witness client devices 108(1) and 108(2) can also capture physiologic data (e.g. PPG data) from the face or other body location of user 102, and this physiologic data can be included in movement data 238 and 240, respectively, and evaluated by authentication software 212 as a further non-obvious determination of fraud, since the appropriate physiologic data (e.g. PPG data) from each of root and witness client devices 108(1) and 108(2) would not match if different people were used. Further, although not identifying of an individual person, the physiologic data (e.g. PPG data) can include expected physiologic characteristics (e.g. based on age or known health issues of user 102) and thus an imposter can be detected when these characteristics are not matched correctly. In another example, while performing interactive task 230, user 102 may present a finger to one or both of root and witness client devices 108(1) and 108(2) and PPG or other physiologic data can be captured, such as by using a fingerprint scanner, optical sensor, and/or other sensor on either or both client devices.

In some embodiments, 3D data from the scanning (e.g. facial scanning) by infrared projector/scanner 218 and 220 can be processed to select a subset of characteristics that may not be able to be used to assuredly identify user 102, but that can be used to distinguish user 102 from other people based upon this subset of characteristics. For example, application 208 can process 3D data from infrared projector/scanner 218 and 220 to determine certain characteristics of the face (e.g. only nose and upper lip), and send these characteristics to authentication software 212 where they can be compared with previously captured characteristics of user 102 to confirm that user 102 is who they claim to be. While these recorded characteristics may not be able to assuredly identify user 102, these characteristics can be used to detect when the person presenting as user 102 is an imposter.

In some embodiments, system 10 is configured to perform a passwordless authentication method that authenticates a user to access a remote computer, such as is described in co-pending U.S. patent application Ser. No. 17/290,740, titled "Passwordless Authentication Systems and Methods", filed Apr. 30, 2021. A mobile device can receive a flash pattern from a webpage and emit the flash pattern towards a body part of a user of the mobile device that is being authenticated (e.g. at least biometrically authenticated) at the mobile device. Concurrently with the authenticating, a detected remission of the modulated optical signal by the body part can be recorded and used to verify that the authentication occurred during access to the website. Using a similar technique, website 106 can provide a randomly generated flash pattern that is projected onto the face of user 102 during witnessed authentication, such as while user 102 performs interactive task 230, and a corresponding flash pattern can be detected and extracted from images captured by camera 214/216 and/or infrared projector/scanner 218/220. The extracted flash pattern does not contain identifying biometric and/or other sensitive information and can be included with movement data 238/240 and sent to authentication server 104 where authentication software 212 can evaluate the flash pattern in the movement data against the flash pattern output on website 106 to verify that one or both of root and witness client devices 108(1) and 108(2) are located near where the website is being accessed. Such additional testing can further improve the level of trust in witnessed authentication of user 102, since spoofing of the authentication by a nefarious party is made more difficult by requiring the flashing pattern to match.

Remote Witnessing of Authentication

To ensure a user that is accessing a resource (e.g. a website or a third party at a location remote from the user) is who they say they are, a witness can verify that the user is performing an authentication on a known client device at a particular time, and the witness can provide evidence that allows the entity being accessed (or another authenticating party) to verify that it is not receiving a previously recorded authentication of the user. When the witness is near to the user, the witness can provide evidence of the user being authenticated (e.g. using the witness client device to simultaneously capture evidence of the real-time authentication of the user by the root client device, as described above). However, when there is no witness nearby, directly witnessed authentication is not possible. Advantageously, the embodiments described herein provide a method for allowing a witness that is located remotely from the user to be authenticated to provide evidence that the user is authentic. As with the above described methods, the root client device can be configured to authenticate biometric and/or other characteristics (singly or collectively "biometric characteristics" herein) of the user to the root client device.

By providing evidence of the user performing the authentication live (e.g. not a recording), the witness provides the resource, or authenticating party, with an increased level of trust that the authentication of the user is valid, since spoofing of the authentication by a nefarious party is made more difficult by requiring the remote witness. Particularly, where the witness is selected at random from a plurality of available witnesses by the entity (e.g. a financial institution and/or a government security agency) requiring the authentication, a nefarious party is unable to predict who will witness the authentication and is also unable to use a false witness.

Figure 10:
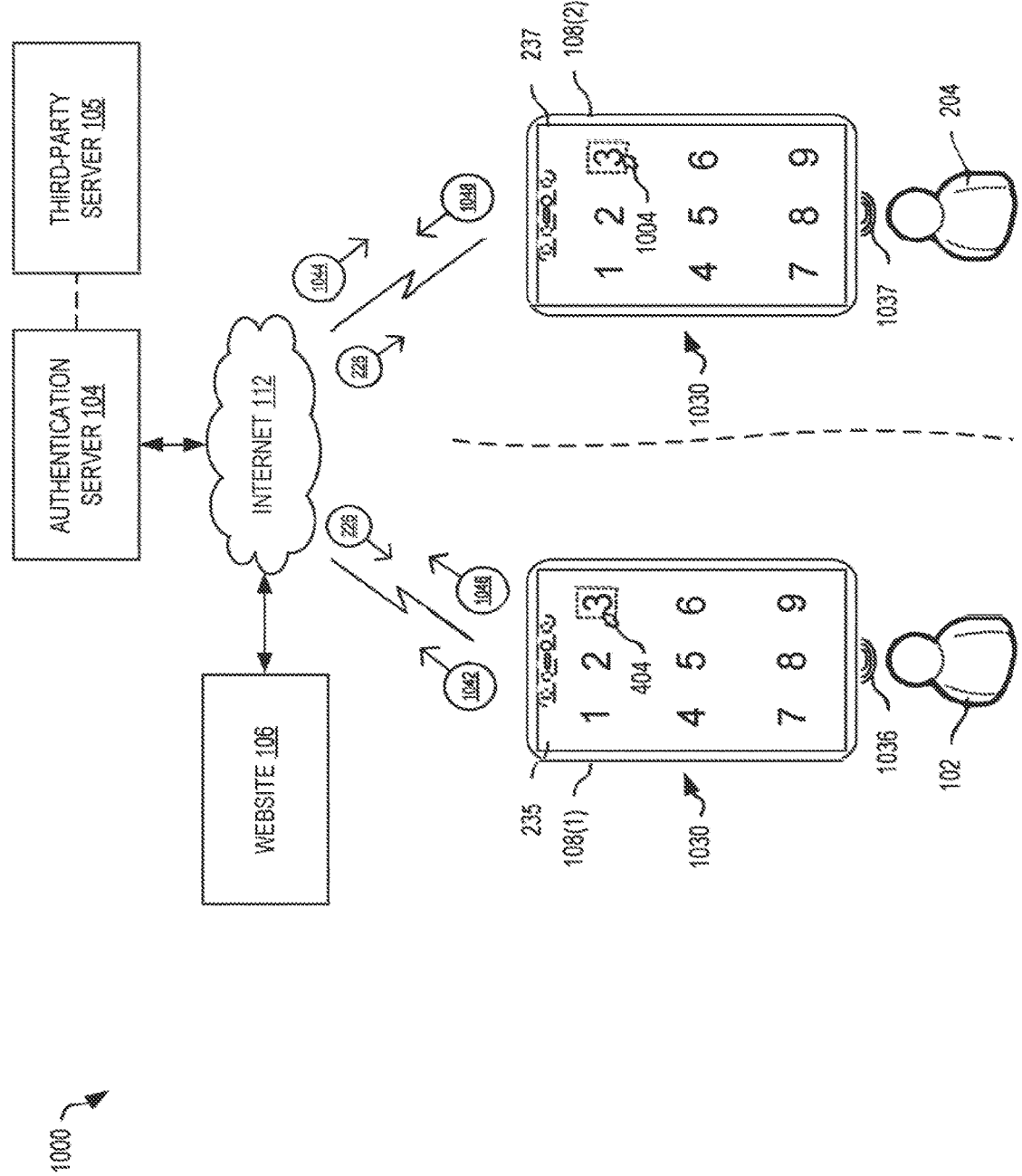
FIG. 10 illustrates a functional block diagram showing one example authentication witness system that provides improved level of trust using a remote witness to authenticate a user to an authentication server, consistent with the present inventive concepts.

FIG. 10 is a functional block diagram showing one example authentication witness scenario 1000 that improves a level of trust when authenticating a user 102 to an authentication server 104 (e.g. to access a protected resource such as a financial account, a transaction, a transfer, a document, and the like) via a website 106. Unlike the above described scenarios, examples, and solutions, root client device 108(1) and witness client device 108(2) are located remotely from each other and do not directly communicate using short range wireless protocols, and witness client device 108(2) cannot simultaneously capture facial, head, eye, and/or other body part movement and/or physiologic data of user 102 during authentication of user 102 by root client device 108(1). Accordingly, witness 204 is asked to witness the authentication of user 102 on root client device 108(1) remotely. User 102 is asked to perform an interactive task 1030 presented on a display 235 of root client device 108(1), while being authenticated by root client device 108(1). Witness 204 is asked to witness and respond to user 102 performing the interactive task 1030, by following the actions (e.g. motions) of user 102 that are displayed on display 237 of witness client device 108(2), and optionally, while witness 204 is authenticated by witness client device 108(2). Functionality of authentication server 104 and client device 108 is similar to functionality described above with reference to FIGS. 1 through 9, but modified to allow remote witnessing of the authentication as described below.

To initiate the witnessed authentication, authentication software 212 running in authentication server 104 sends messages 226 and 228 (e.g. notifications) to root and witness client devices 108(1) and 108(2), respectively, that causes each client device to start application 208 when it is not already running. Message 226 instructs application 208 running on root client device 108(1) that it is to behave as the root client device, and message 228 instructs application 208 running on witness client device 108(2) that it is the witness client device. In some embodiments, both root and witness client devices 108(1) and 108(2) determine (e.g. automatically determine) that short-range direct communication with each other is not possible, and that root and witness client devices 108(1) and 108(2) are remotely located from each other.

When remotely located, application 208, running on each respective root and witness client device 108(1) and 108(2), selects a corresponding remote interactive task, such as interactive task 1030. Messages 226 and 228 can also include task code 232 that is randomly generated by authentication server 104 and used to determine which of a plurality of different and varied remote interactive tasks (e.g. interactive task 1030) is to be performed by user 102.

In the example of FIG. 10, interactive task 230 includes a grid of numbers presented on display 235 of root client device 108(1) and on display 237 of witness client device 108(2). Unlike the examples of FIGS. 1, 2A, 2B, 4, 5, 6, 8 and 9, interactive task 1030 does not use a virtual screen that is shared between both root and witness client devices 108; instead, interactive task 1030 has substantially the same content on both displays 235 and 237 of corresponding root and witness client devices 108. In one embodiment, witness 204 can generate instructions (e.g. audible or visual instructions that are captured by witness client device 108(2) and sent to root client device 108(1) via authentication server 104) for user 102 to follow to complete interactive task 1030. In some embodiments, authentication server 104 generates instructions for user 102 to follow to complete interactive task 1030.

Application 208 running in root client device 108(1) outputs audio 1036 instructing user 102 to complete interactive task 1030. For example, audio 236 can verbally, or a provided display can visually, instruct user 102 to "move the cursor to number three, then move the cursor to number seven." Application 208 can track head, eye, and/or other movement of user 102 to control movement of cursor 404 to select the numbers on display 235 as instructed.

Application 208 running on root client device 108(1) captures interactive task 1030 related updates to display 235 caused by actions (e.g. cursor movements and/or selection of numbers) of user 102 and sends the updates to authentication server 104, illustratively shown as message 1042. Authentication server 104 forwards the updates to witness client device 108(2), shown as message 1044, and application 208 running on witness client deice 108(2) shows the updates on display 237 of witness client device 108(2). Although shown as single messages 1042 and 1044, these messages represent frequent flow of data corresponding to real-time task updates (e.g. actions) by user 102. Thus, witness client device 108(2) shows the actions (e.g. motions) of user 102 performing interactive task 1030 substantially in real-time. Application 208, running on witness client device 108(2) can instruct witness 204 to also interact with interactive task 1030 on witness client device 108(2) by responding to the actions made by user 102 as shown on display 237. In one example, witness 204 is instructed via output from witness client device 108(2) (e.g. via audio 1037), to make actions (e.g. motions) similar to user 102, such as to use head, eye, and/or other movements to control a cursor 1004 to select the numbers that are selected by user 102. In another example, witness 204 is instructed via output from witness client device 108(2) (e.g. via audio 1037), to tap (e.g. using a finger) on a highlighted number on display 237, where the highlighted number corresponds to selections made by user 102. Accordingly, witness 204 confirms or replicates actions made by user 102.

In one example of operation, user 102 is instructed (e.g. via audio 1036) to "move the cursor to number three," and witness 204 is instructed (e.g. via audio 1037) to "move the cursor to select the highlighted numbers." As user 102 follows this instruction, application 208 sends display updates (e.g. as message 1042 including cursor movements and/or number selection) to authentication server 104, which in turn sends a corresponding display update (e.g. as message 1044) to witness client device 108(2) that causes application 208 to update display 237 of witness client device 108(2) to show the cursor movement and number selection made by user 102. In response to seeing the cursor move to the number three, witness 204 makes actions (e.g. as instructed by application 208) to control a local cursor 1004 to move to and select the number three. Application 208 running on witness client device 108(2) captures movement of witness 204, and the selection of the number three, and sends this information in message 1048 to authentication server 104.

As described in detail above, root client device 108(1) captures facial movements as user 102 performs interactive task 1030. Similarly, witness client device 108(2) captures movement data 240 of witness 204 responding to actions taken by user 102. At one or more times (e.g. at the beginning, midway through, and at the end) during capture of movement data 238 and 240, while user 102 responds to interactive task 1030 and witness 204 responds to actions taken by user 102, application 208 can cause root client device 108(1) to authenticate user 102 using facial recognition and application 208 can cause witness client device 108(2) to authenticate witness 204 using facial recognition.

When interactive task 1030 is complete, application 208 running on root client device 108(1) sends a message 1046 to authentication server 104 containing results of the one or more authentications performed by root client device 108(1) during interactive task 1030, actions (e.g. selected numbers) of user 102, and/or movement data 238. Application 208 running on witness client device 108(2) sends a message 1048 to authentication server 104 containing results of the one or more authentications performed by witness client device 108(2) during interactive task 1030, actions (e.g. selected numbers) of witness 204, and movement data 240 of witness 204. Authentication software 212 processes messages 1046 and 1048 to determine authentication results 246 that indicate whether access to website 106 (or the protected resource, transaction, transfer, document, and the like) is granted for user 102. In this processing, authentication software 212 evaluates the results of authenticating user 102 during interactive task 1030, received in message 1046, to determine if a first level of trust is confirmed. Authentication software 212 also evaluates the results of authenticating witness 204 during interactive task 1030 received in message 1048 and determines if a second level of trust is confirmed. If either or both the first and second levels of trust are not confirmed, software 212 terminates (e.g. denies) authentication.

Authentication software 212 can then compare results (e.g. number selections) from the completed interactive task 1030 by user 102, and the results (e.g. number selections) from the interactive task 1030 performed by witness 204. Matching results indicate that witness 204 successfully viewed and replicated actions (e.g. motions) made by user 102. When the results do not match, authentication software 212 terminates with unsuccessful authentication of user 102.

Next, authentication software 212 can compare movement data 238, received in message 1046, to movement data 240, received in message 1048, to determine whether witness 204 made similar movements to those of user 102 to determine a second level of trust. For example, where witness 204 makes similar movements to those made by user 102, each root and witness client device 108(1) and 108(2) captures substantially the same movements as user 102 follows interactive task 230 and witness 204 follows actions, seen on display 237, of user 102. Accordingly, movement data 240 (of witness 204) should include movements very similar to movements defined by movement data 238 (of user 102). Slight timing variances between actions in movement data 238 and in movement data 240 are expected and allowed for, however. Authentication software 212 can also compare detected actions (e.g. facial movement and/or other recorded movement) to expected movement 728 corresponding to task code 232. For example, the sequence and timing of movements detected and stored within each of movement data 238 and 240 should be similar to expected movement 728 for interactive task 230 corresponding to the generated task code 232. Thus, a replay attack where previously captured messages 1042 and 1044 are resent to authentication server 104 will not match expected movements, since task code 232 is regenerated for each two-device authentication attempt and thus the expected movements are not the same for subsequent authentications. Accordingly, authentication software 212 is not fooled by replay attacks, making subterfuge significantly more difficult.

In some embodiments, interactive task 1030 can involve witness 204 choosing two numbers in a range of numbers (e.g. between one and nine) at random, and asking user 102 to select the chosen numbers (e.g. 3 and 7) on display 235 using head/face/eye and/or other movement based cursor control. When witness 204 confirms that user 102 used cursor control to select the number chosen by witness 204, authentication server 104 can analyze movement data received from root client device 108(1) to verify that the user's movements correspond to the position of numbers chosen by witness 204 and sent to authentication server 104. Using the example of selecting the three and then the seven, authentication server 104 determines that the user's movement corresponds to the chosen numbers when movement data indicates that a body part (e.g. the head) of user 102 first moves up and right (e.g. when selecting the number three) and then down and left (e.g. when selecting the number seven). When such movement is not found in the movement data, authentication server 104 can determine the authentication as fraudulent. Similarly, where witness 204 follows the cursor movement on display 237, authentication server 104 can verify that movement data from witness client device 108(2) also includes similar movements that were captured contemporaneously.

Authentication software 212 can send a message 252 to third-party server 105 indicating a result (e.g. success or failure) of witnessed authentication of user 102, where success indicates that user 102 was successfully authenticated on root client device 108(1), the captured movement data 238 matches movement data 240 indicating that witness client device 108(2) was present to witness the authentication, and that one or both of movement data 238 and 240 matches expected movement (see for example expected movement 728 in FIG. 7) corresponding to interactive task 230 to indicate that user 102 performed the interactive task 230. Success of all evaluations by authentication software 212 indicates a higher level of trust that user 102 is who they claim to be. As with local authentication (e.g. where root and witness client devices 108 are at the same location), witness 204 can be known or unknown to any one or more of user 102, authentication server 104, and/or third-party server 105. One advantage over a verbal indication, where a third party verbally indicates that user 102 is who they say they are, is that, for the scenario shown in FIG. 10, witness 204 is authenticated to witness client device 108(2) during witnessing of the authentication, and thus the witness cannot be replaced by a nefarious party attempting to impersonate the witness without detection. Particularly, root client device 108(1) can confirm a physiologic and/or other biometric characteristic of the user to identify the user 102, and in the same period, both user 102 and witness 204 interact (e.g. using interactive task 1030) and either (a) head/facial/eye/other body part motion captured by both root client device 108(1) and witness client device 108(2) during the interaction and is sent to authentication server 104 (or third-party server 105) or (b) actions (e.g. cursor movements and/or number selections, and the like) made by both user 102 and witness 204 are sent from the root client device and the witness client device, respectively, to the authenticating server 104. The authentication server 104 verifies that the movements and/or other actions match and correspond to the provided interactive task 1030. For example, as user 102 makes head, eye, and/or other body part movements to move a cursor over one of a plurality of images (e.g. pictures, icons, text, and the like) on a screen of root client device 108(1), the cursor movement is sent to witness client device 108(2) via authentication server 104, and witness 204 uses head, eye, and/or other body part movements to control a local cursor to select the same image. In another example, as user 102 makes head, eye, and/or other body part movements to move a cursor over one of a plurality of images on a screen of root client device 108(1) to select one or more of the images, witness client device 108(2) is controlled to show one or both cursor movement and image selection(s) made by user 102. Other types of interactive game, challenge, and/or activity can be used to allow both parties to engage at the same time.

Where user 102 and witness 204 are at the same location, but not known to one another, handing over of witness client device 108(2) to user 102 may not be desired. Further, where interactive task 230/1030 requires user 102 to control a cursor (e.g. cursor 404), such as to select a pre-known image (e.g. picture, icon, or the like) or select a code using displayed digits, it may be desirable to hide the selections made by user 102 from witness 204. Accordingly, in some embodiments when user 102 and witness 204 are collocated, but witness 204 is a stranger to user 102, user 102 may not wish for information and/or actions made during the authentication process to be overseen by witness 204. Accordingly, rather than sharing the same virtual screen for display on both root and witness client devices 108, a separate, non-virtual screen can be generated for display on witness client device 108(2).

Preferably, even though unknown to user 102, witness 204 is known in another context, such as an Uber driver, a FedEx driver, or employee of another well known organization, where witness 204 is thus known and tracked by another reliable server. Accordingly, through tracking by another server (e.g. Uber or FedEx), witness 204 provides increased trust over another witness that is not known and is not tracked by another server. As noted above, any company/organization that registers and tracks a smartphone and/or computer of a user on the company's database would allow that user to fulfill this notary type authentication service. Similarly, hotel desk employees, pharmacy employees, bank and other such business employees may fulfill this notary type authentication service. Since the user/employee is registered with the company/organization, the user/employee is traceable by authentication server 104 if needed. This independent tracking of witness 204 provides additional trust in the authentication of user 102 provided by system 100.

Figure 11:
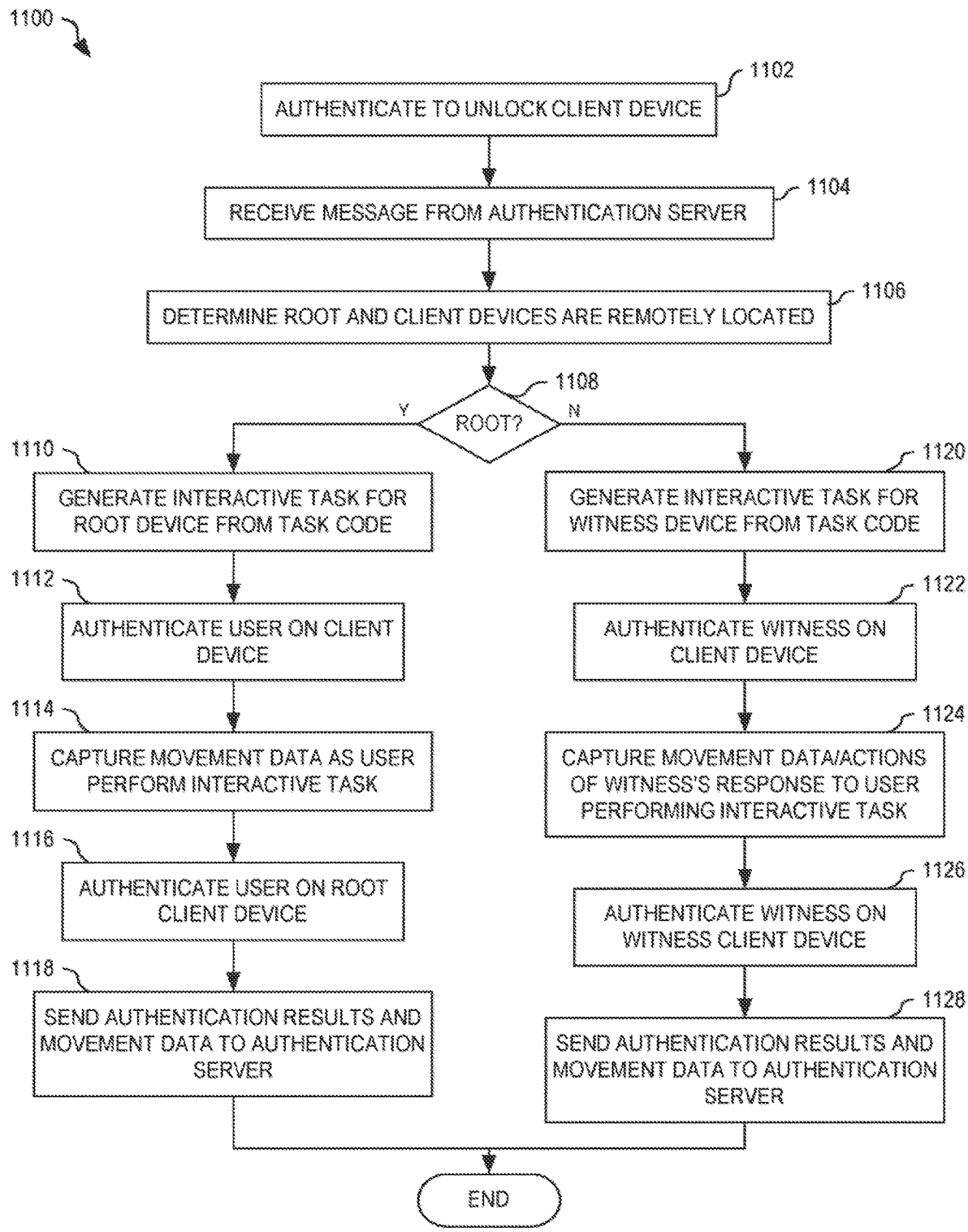
FIG. 11 illustrates a flowchart showing one example method for remotely witnessing authentication of a user of a root client device, consistent with the present inventive concepts.

FIG. 11 is a flowchart illustrating one example method 1100 for remotely witnessing authentication of a user of a root client device. Method 1100 is implemented within application 208, for example.

In block 1102, method 1100 authenticates to unlock the client device. In one example of block 1102, application 208 authenticates user 102 to unlock root client device 108(1). In another example of block 1102, application 208 authenticates witness 204 to unlock witness client device 108(2). In block 1104, method 1100 receives a message from an authentication server. In one example of block 1104, application 208, running in root client device 108(1), receives message 226 from authentication server 104. In another example of block 1104, application 208, running in witness client device 108(2), receives message 228 from authentication server 104. Messages 226 and 228 can indicate which of the root and witness client devices the application 208 is running on.

In block 1106, method 1100 determines that the root and client devices are remotely located. In one example of block 1106, application 208 running on root client device 108(1) fails to connect with wireless client device 108(2) using a short range wireless protocol (e.g. Bluetooth) and therefore determines that wireless client device 108(2) is not at (or near) the location of root client device 108(1). In block 1108, a decision is made. If, in block 1108, method 1100 determines that method 1100 should continue with blocks 1110 through 1118 executed on the root client device, and method 1100 continues with block 1110; otherwise, method 110 continues with blocks 1120 through 1128 on the witness client device, and method 1100 continues with block 1120.

In block 1110, method 1100 generates an interactive task for the root client device from the task code and outputs instructions (e.g. audio instructions). In one example of block 1110, application 208 running on root client device 108(1) generates interactive task 1030 to display a grid of numbers on display 235 of root client device 108(1) and outputs information (e.g. audio 1036) from root client device 108(1) instructing user 102 to use head, eye, and/or other body part movement to control cursor 404 to select a particular number or other icon (e.g. number three). In block 1112, method 1100 authenticates the user on the root client device. In one example of block 1112, application 208 invokes root client device 108(1) to authenticate user 102.

In block 1114, method 1100 captures movement data as user performs the interactive task. In one example of block 1114, as user 102 performs interactive task 1030 on root client device 108(1), application 208 captures movement data 238. In block 1116, method 1100 authenticates the user on the root client device. In one example of block 1116, application 208 invokes root client device 108(1) to authenticate user 102. In block 1118, method 1100 sends authentication results and the movement data to the authentication server. In one example of block 1118, application 208 sends message 242 containing authentication results 246 and movement data 238 to authentication server 104. Method 1100 then terminates.

In block 1120, method 1100 generates an interactives task for the witness client device from the task code and outputs instructions to the witness from the witness client device. In one example of block 1120, application 208 generates interactive task 1030 to display the same grid of numbers on display 237 of witness client device 108(2) and outputs information (e.g. audio 1037) from witness client device 108(2) instructing witness 204 to use head, eye, and/or other body part movement to control cursor 1004 to select numbers highlighted on display 237. In block 1122, method 1100 authenticates the witness on the witness client device. In one example of block 1122, application 208 invokes witness client device 108(2) to authenticate witness 204 and updates authentication results 248.

In block 1124, method 1100 captures movement data/actions of witness's response to the user performing the interactive task. In one example of block 1124, application 208 captures movement data 240 as witness 204 responds to updates of display 237 as user 102 performs interactive task 1030. In block 1126, method 1100 authenticates the witness on the witness client device. In one example of block 1126, application 208 invokes witness client device 108(2) to authenticate witness 204 and updates authentication results 248. In block 1128, method 1100 sends the authentication results and the movement data to the authentication server. In one example of block 1128, application 208 sends message 244 containing authentication results 248 and movement data 240 to authentication server 104. Method 1100 then terminates.

Figure 12:
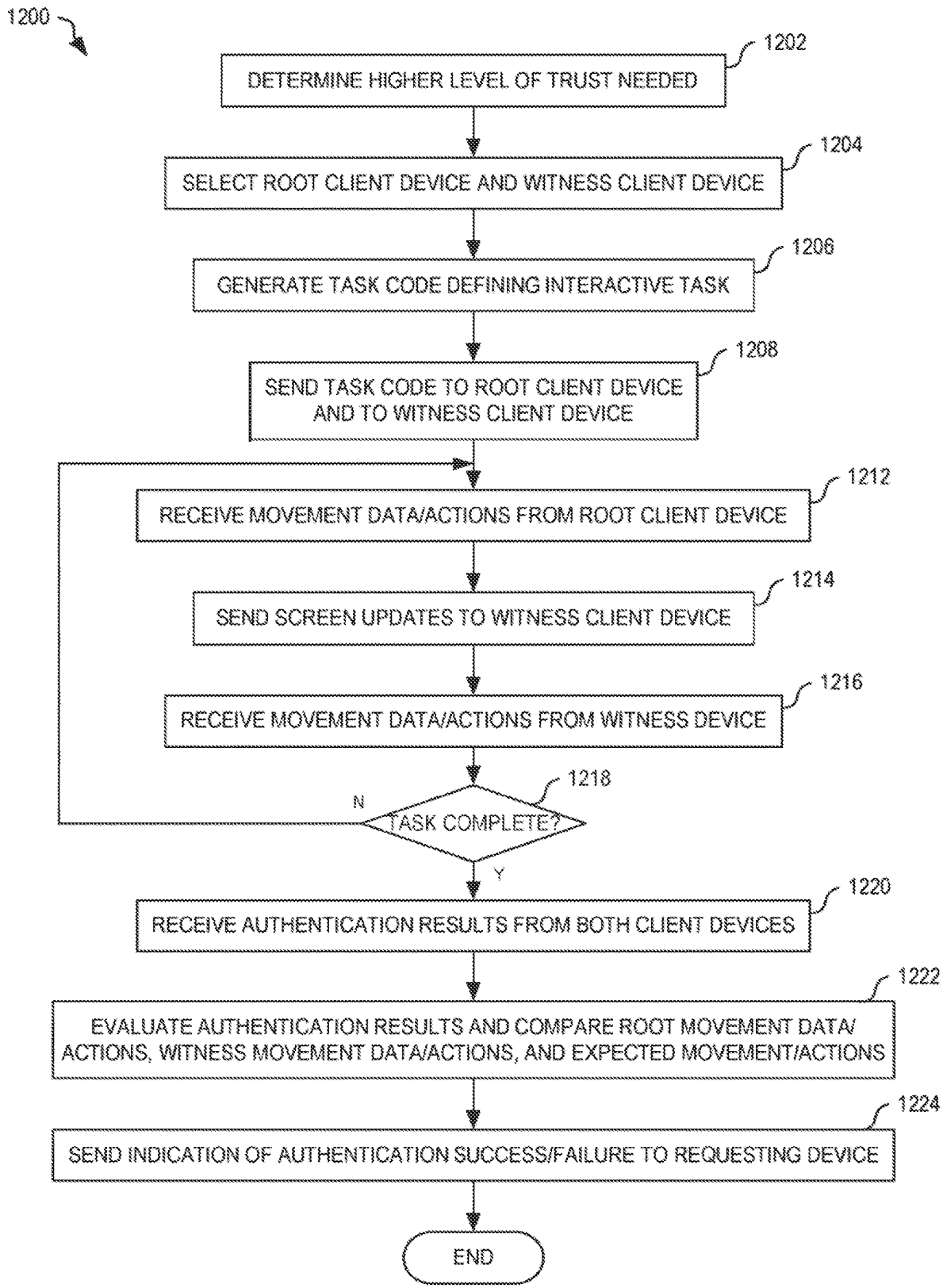
FIG. 12 illustrates a flowchart showing one example remote authentication witness method for witnessing authentication of a user to provide an improved level of trust, consistent with the present inventive concepts.

FIG. 12 is a flowchart illustrating one example remote authentication witness method 1200 for witnessing authentication of a user to provide an improved level of trust. Method 1200 is similar to method 900 of FIG. 9, but adapted to allow the witness to be remote from the user being authenticated. Method 1200 is implemented in authentication software 212 of authentication server 104, for example.

In block 1202, method 1200 determines that a higher level of trust is needed. In one example of block 1202, authentication software 212 receives request 250 that indicates that a higher level of trust in authentication of user 102 is required. In block 1204, method 1200 selects a root client device and a witness client device. In one example of block 1204, authentication software 212 determines root client device 108(1) by retrieving user account 712 and user client device ID 714 from database 706 based upon an identifier (e.g. username, account number, and the like) of user 102, and authentication software 212 also determines witness client device 108(2) from witness client device ID 718 in witness client device list 716 of database 706 based upon one or more of previous association and/or current location of client devices 108.

In block 1206, method 1200 generates the task code defining the interactive task. In one example of block 1206, authentication software 212 invokes code generator 708 to generate task code 232 and expected movement 728 that defines movements expected to complete interactive task 230. In block 1208, method 1200 sends the task code 232 to the root client device. In one example of block 1208, authentication software 212 sends message 226, including task code 232 and indicating that the recipient is the root client device, to root client device 108(1). Also in block 1208, method 1200 sends the task code 232 to the witness client device. In one example of block 1208, authentication software 212 sends message 228, including task code 232 and indicating that the recipient is the witness client device, to witness client device 108(2).

In block 1212, method 1200 receives movement data and/or selection actions from the root client device 108(1). In one example of block 1212, authentication software 212 receives movement data 238 and/or selection actions from root client device 108(1). In block 1214, method 1200 sends screen updates to witness client device 108(2). In one example of block 1214, authentication software 212 sends updates to display 237 corresponding to movement data 238 and/or selected actions received from root client device 108(2) In block 1216, method 1200 receives movement data and/or selection actions from the witness client device. In one example of block 1216, authentication software 212 receives movement data 240 and/or selection actions from witness client device 108(2).

In block 1218 a decision is made. If, in block 1218, method 1200 determines that the interactive task has been completed, method 1200 continues with block 1220; otherwise, method 1200 continues with block 1212. Blocks 1212 through 1218 repeat until user 102 and witness 204 finish interactive task 1030.

In block 1220, method 1200 receives authentication results from both client devices 108. In one example of block 1220, authentication software 212 receives authentication results 246 from root client device 108(1) and receives authentication results 248 from witness client device 108(2). In block 1222, method 1200 evaluates the authentication result and compares the root movement data and/or selection actions, the witness movement data and/or selection actions, and the expected movements and/or selection actions. In one example of block 1222, authentication software 212 evaluates authentication results 246 to determine that authentication of user 102 in root client device 108(1) was successful and evaluates authentication results 248 to determine that authentication of witness 204 in witness client device 108(2) was successful, then compares movement data 238 and/or selection actions to movement data 240 and/or selection actions to determine whether the authentication was successfully witnessed, and then determines whether interactive task 1030 was performed correctly by comparing one or both of movement data 238 and/or selection actions and movement data 240 and/or selection actions to expected movement 728 and/or expected selection actions.

In block 1224, method 1200 sends an indication of authentication success to the requesting device. In one example of block 1224, authentication software 212 sends message 252 to third-party server 105 indicating success or failure of witnessed authentication of user 102.

Method 1300 confirms that witness 204 experienced user 102 performing interactive task 1030 in real-time, and since user 102 was authenticated by root client device 108(1) as interactive task 1030 was being performed, witness 204 confirms that the authentication occurred in real-time by user 102. Since witness 204 is following the actions of user 102 (e.g. repeating the witnessed actions) without receiving direct instructions from the authentication server 104, when movement data 240 (e.g. movements of witness 204) matches expected movement 728, authentication server 104 increases confidence that user 102 was authenticated by root client device 108(1).

Although the user interactively controls cursor 404 to select numbers on a screen, interactive task 1030 can also be an interactive game, a word game, or other such task where the user 102 provides interaction in real-time that can be witnessed remotely.

In some embodiments, witness 204 may be known to user 102 (e.g. identified in witness ID list 716 in association with user 102). In other embodiments, witness 204 may not be known to user 102, but may be selected by authentication server 104.

In the above embodiments, the user 102 performs the task that is replicated by witness 204. However, the roles can be reversed, whereby witness 204 performs interactive task 1030, and movement data 238 of user 102 is captured in response to that performance.

Virtual World

In some embodiments, interactive task 1030 can represent a virtual world where user 102 and witness 204 may meet and where actions of user 102 can be witnessed by witness 204. For example, both of user 102 and witness 204 can each control their own avatars (e.g. a root avatar and a witness avatar) in the virtual world and may thereby meet virtually at a selected (e.g. by either of user 102 or witness 204) location in the virtual world. In some embodiments, head, facial, eye, and/or other body part movements of user 102 are captured by root client device 108(1) and control corresponding head, facial, eye, and/or other body part movements of the root avatar in the virtual world. Similarly, head, facial, eye, and/or other body part movements of witness 204 are captured by witness client device 108(2) and control corresponding head, facial, eye, and/or other body part movements of the witness avatar. Accordingly, when at the same location in the virtual world, user 102 and witness 204 may view each other's movements.

In some embodiments, the user 102 and the witness 204 can be instructed to meet at a location within the virtual world that is selected based on head, eye, and/or other body part movements of both user 102 and witness 204.

Anonymous Witness

A user is often part of an online community, where members of the community can confidently recognize one another, and form a group that is able to defend itself strongly against fraud and scams of nefarious parties, where any intruder or person impersonating another member is quickly discovered. Such a community is a good source of witnesses that can be utilized for witnessed authentication. For example, such a community provides a better and safer way to recognize and confirm the user is who they claim to be, and to detect someone impersonating the user, than an individual such as a bank person could (e.g. a bank or similar person that is not in regular contact with the user), since the bank person has insufficient contact with the user to recognize the voice of user. The members of the community can collectively validate each another through frequent contact. Advantageously, the embodiments herein can use such communities. However, members of such a community may not wish to be identified to the authentication server or third party.

In certain situations, it is preferred that a witness, and their witness client device, are not known to either the authentication server or to the third-party server, but the witness and their witness client device are preferably known to, and trusted by, a user being authenticated. When the witness client device (and thus the witness) is anonymous to the authentication server, a vulnerability of the witness's identity (or the identity of their client device) being learned from traffic intercepted between the authentication server and the root client device (of the user being authenticated) is eliminated. Thus, a nefarious party cannot learn of, compromise, or replicate the witness or the witness client device since it is not identified to the authentication server and is not traceable at the time of authentication. The nefarious party cannot replicate or impersonate an unknown entity. However, the authentication server needs to determine that the anonymous witness is authorized, by the user, to witness authentication of the user. That is, the authentication server needs to be able to verify that the anonymous witness is one of the people trusted by the user to provide the witnessed authentication.

Figure 13:
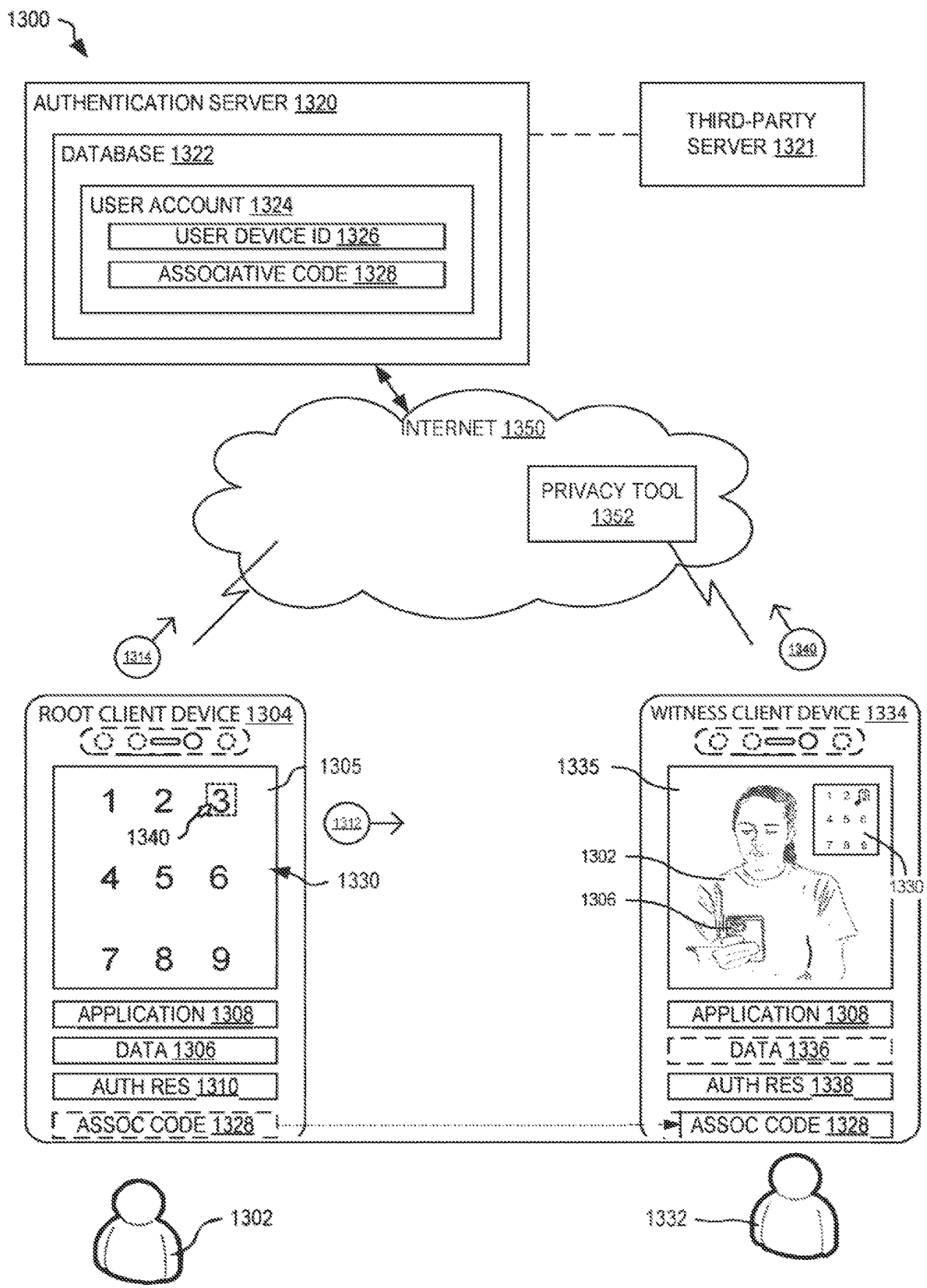
FIG. 13 illustrates a functional block diagram showing one example system for anonymous remote witnessed authentication, consistent with the present inventive concepts.

FIG. 13 is a functional block diagram showing one example system 1300 for anonymous witnessed authentication. System 1300 includes Internet 1350 which can be used for communication between two or more components of system 1300. Internet 1350 can be configured and used in a similar way to Internet 112 described herein. System 1300 includes an authentication server 1320 that accepts evidence via message 1340, from a witness 1332 to a user 1302 performing authentication on a root client device 1304 (e.g. similar to root client device 108(1) described herein). Witness 1332 is known to user 1302, but witness 1332 and a witness client device 1334 (e.g. similar to witness client device 108(2) described herein) used by witness 1332 is anonymous to authentication server 1320 (and third-party server 1321). Further, witness client device 1334 is also untraceable by, authentication server 1320 (and third-party server 1321). Witness 1332 may be local to user 1302 (e.g. at the same location) or may be remote from user 1302 (e.g. performing a remote witnessed authentication as described above). However, in either case, witness 1332 remains anonymous to authentication server 1320 and third-party server 1321.

In this example, an application 1308 is downloaded to (e.g. via Internet 1350), and runs on, each of root client device 1304 of user 1302 and witness client device 1334 of witness 1332. Authentication server 1320 includes a database 1322 that stores a user account 1324 corresponding to user 1302, which can store a user client device ID 1326 that uniquely identifies root client device 1304 and an associative code 1328 that uniquely identifies user account 1324. Authentication server 1320 can provide a service to a third-party server 1321 that protects a valuable asset (e.g. bank account, stocks, real-estate, and/or another valuable asset) of user 1302 by improving trust in authentication when user 1302 accesses third-party server 1321. For example, when user 1302 requests access to third-party server 1321 to make a high-value transaction, third-party server 1321 can invoke authentication server 1320 to perform a user authentication routine that further validates the authentication of user 1302 and thereby gain trust that user 1302 is who they claim to be. However, to develop additional trust in user 1302, authentication server 1320 can require proof that the witness 1332 witnessing the authentication of user 1302 is the trusted witness that user 1302 selected, and that neither user 1302 nor witness 1332 are imposters. In one scenario, a nefarious party may obtain and compromise root client device 1304 to impersonate user 1302, and may then attempt to use an equally nefarious accomplice to impersonate witness 1332.

In some embodiments, to prevent fraudulent use of root client device 1304 when compromised, authentication server 1320 ensures that witness client device 1334 belongs to an authorized witness of user 1302 by verifying a code (e.g. a unique token) previously configured with witness client device 1334. For example, prior to witnessed authentication (e.g. days, weeks, before), user 1302 interacts with application 1308 to request associative code 1328 from authentication server 1320 and securely passes associative code 1328 to witness client device 1334 of witness 1332. For example, when asking witness 1332 to act as an authentication witness, user 1302 may interact with application 1308 to receive associative code 1328 from authentication server 1320 and transfer associative code 1328 to witness client device 1334 using a short range encrypted wireless protocol (e.g. Bluetooth). For security reasons, application 1308 running on root client device 1304 only stores associative code 1328 temporarily on root client device 1304, deleting it from root client device 1304 once it is transferred to witness client device 1334. Accordingly, associative code 1328 is not retrievable from root client device 1304, should root client device 1304 become compromised. Thereafter, witness client device 1334 sends associative code 1328 to authentication server 1320 as confirmation of its authority to witness authentication of user 1302. Authentication server 1320 cannot identify witness 1332 or witness client device 1334, since it did not deliver associative code 1328 directly, and user 1302 was able to deliver associative code 1328 independently of authentication server 1320.

In one example of operation, when user 1302 attempts a high value transaction with third-party server 1321, third-party server 1321 invokes authentication server 1320, which communicates with application 1308 running on root client device 1304 to request witnessed authentication. From root client device 1304, application 1308 sends a message 1312 (e.g. a text message, an email, and the like) to witness client device 1334 requesting that witness 1332 witnesses authentication of user 1302 (e.g. an authentication sent via authentication results 1338). Alternatively, user 1302 may call (e.g. using a phone) witness 1332 to request witnessed authentication. Witness 1332 runs application 1308 on witness client device 1334 to initiate witnessed authentication.

In some embodiments, application 1308 establishes a video call between root client device 1304 and witness client device 1334 such that witness 1332 at least sees user 1302 operating root client device 1304. In other embodiments, application 1308 can invoke other software to establish the video call between root client device 1304 and witness client device 1334. On root client device 1304, application 1308 then generates and displays an interactive task 1330 on display 1305 of root client device 1304, and can send data to replicate interactive task 1330 on display 1335 of witness client device 1334. Accordingly, witness 1332 may see the face and actions of user 1302 as user 1302 completes interactive task 1330. Interactive task 1330 can be similar to interactive task 1030 of FIG. 10, but could be similar to any of the aforementioned interactive tasks. Since witness 1332 is able to see user 1302 performing interactive task 1330, witness may verify the facial identity of user 1302, and also verify that user 1302 is performing interactive task 1330 in real-time. In some embodiments, instructions for interactive task 1330 may be provided by witness 1332, whereby witness 1332 achieves further trust that user 1302 is real and is live performing interactive task 1330. Accordingly, witness 1332 may indicate the trust to application 1308 running on witness client device 1334, which sends a message 1340 (e.g. including authentication results 1338) indicating that user 1302 is who they say they are, and including associative code 1328. Message 1340 can also include further evidence of the witnessed authentication of user 1302, such as by including movements of witness 1332 following actions of user 1302.

As user 1302 performs interactive task 1330, application 1308 running on root client device 1304 collects movement data 1306 of user 1302 (e.g. movement data of the head, face, eye, and/or other one or more body parts of the user) that is performing interactive task 1330, and invokes root client device 1304 at intervals (e.g. regular time intervals) to authenticate (e.g. using facial and/or other user recognition routines) user 1302 to root client device 1304 to generate authentication results 1310. Application 1308 then sends movement data 1306 and authentication results 1310 in message 1314 to authentication server 1320. In some embodiments, movement data 1306 comprises both movement data, as well as other data, such as task or other action related data, and/or physiologic data of the user.

Upon receiving messages 1314 and 1340, authentication server 1320 determines that message 1340 corresponds to user account 1324 based on the included associative code 1328, and then determines whether the authentication is trusted based on authentication results 1310 and, where instructions are part of interactive task 1330, a comparison of movement data 1306 to expected movement to complete interactive task 1330 and/or movements of witness 1332 included in message 1340.

Advantageously, witness 1332 sees the face of user 1302 and may thereby determine that user 1302 is who they say they are. When witness 1332 cannot identify user 1302, witness 1332 indicates the identify failure to authentication server 1320 via application 1308 for example, such as by responding negatively to witnessing the authentication, or by not responding at all. Accordingly, authentication server 1320 is immediately aware of an attempted scam. Further, witness 1332 also sees that user 1302 is moving (e.g. their head, face, eyes, and/or other body part) to perform the interactive task 1330, and the corresponding movement data 1306 is also delivered to authentication server 1320 from root client device 1304 for evaluation by authentication server 1320. Thus, this authentication provides more trust than when using only a known witness to confirm the facial identity of user 1302.

To ensure anonymity, application 1308 running in witness client device 1334 can use a privacy tool 1352 (e.g. the onion router (TOR), or similar software), when communicating with authentication server 1320. For example, privacy tool 1352 can form a communication channel between witness client device 1334 and authentication server 1320 (e.g. via Internet 1350) that encrypts message 1340 and obfuscates traceability, such as by using multiple routers. Accordingly, witness client device 1334 cannot be traced by authentication server 1320 or any nefarious party attempting to intercept the communicated data and therefore witness 1332 remains anonymous to authentication server 1320 and third-party server 1321 while witnessing authentication of user 1302. Particularly, a nefarious party intercepting traffic at authentication server 1320 cannot trace witness client device 1334 and learn the identity of witness 1332. In some embodiments, root client device 1304 and/or witness client device 1334 can also establish communication through privacy tool 1352 during authentication of user 1302.

In some embodiments, witness 1332 may control witness client device 1334 to access a website of authentication server 1320 anonymously via privacy tool 1352, and can provide associative code 1328 to authentication server 1320 in a spread-spectrum fashion. For example, rather than including associative code 1328 as a single value in message 1340, associative code 1328 can be encrypted and broken into parts that are delivered to authentication server 1320 at different times. Authentication server 1320 then reassembles received parts and decrypts them to determine associative code 1328, and thereby the corresponding user account 1324.

Since both user 1302 and witness 1332 have visual and/or audio communication, and are known to one another (e.g. friends, family, and the like) they may each visually and/or audibly identify each other, stopping any authentication if the other party is not as expected. Associative code 1328 can be generated and distributed in a way that is difficult to copy or scam from communications. For example, associative code 1328 can be dispersed within communications in a way that only authentication application 1308 and authentication server 1320 are aware of and thus a nefarious party would find it difficult, if not impossible, to detect and assemble associative code 1328.

Since authentication server 1320 receives movement data 1306 corresponding to movements of user 1302, authentication server 1320 can determine when bio-behavioral characteristics in the movement data do not match previously captured bio-behavioral characteristics of user 1302. In some embodiments, more than one witness can be used to provide additional trust in the authentication of user 1302. For example, two different witness client devices 1334 of two different witnesses 1332 at different locations may be selected and used simultaneously to provide two independent witness reports of user 1302 being authenticated by root client device 1304.

In another example, witness 1332 may instruct, via the video call, to switch to another device, that witness 1332 knows (since they are personally acquainted) user 1302 has, thereby witness 1332 may use personal knowledge of user 1302 to verify that user 1302 is who they say they are. In another example, using application 1308, witness 1332 may cause a selection of images to be displayed on display 1305 of root client device 1304, where one image is known to user 1302 (e.g. a picture and/or other visual image of a mutual friend, animal, vehicle, house, slogan, and the like), whereby user 1302 directs their gaze, or otherwise causes a cursor to move to select, that image. Since this particular image is only known to user 1302, witness 1332 may confirm that user 1302 is who they say they are and not an imposter. In some embodiments, the image can be prearranged between witness 1332 and user 1302, and other images can be randomly selected from a stock set by application 1308 and/or authentication server 1320. In another example, witness 1332 and user 1302 can prearrange a certain action or actions restriction, such as limiting cursor movement to a right side of interactive task 1330, such that cursor movement can indicate whether user 1302 is not who they say they are. Such pre-agreed responses by user 1302 and witness 1332 may occur without the nefarious party learning what information is being used and evaluated. Accordingly, even if the nefarious party obtains root client device 1304, the nefarious party will be discovered by witness 1332.

In some embodiments, user 1302 may wear a device that accurately tracks user movement (e.g. eye movement, head movement, and/or other body part movement) relative to displayed content such that witness 1332 sees, on display 1335, what user 1302 is looking at. Thus, user 1302 may not specifically select one image over another, but may focus on it for an extended period of time (e.g. glance at it longer). Since witness 1332 sees the associated movement (e.g. eye movement), witness 1332 can tell which image (e.g. picture, icon, or the like) is of more interest to user 1302. Accordingly, such actions are very difficult for the nefarious party to intercept, learn, and replicate.

In some embodiments, authentication server 1320 can receive (e.g. in message 1340), non-identifying data regarding user 1302 and/or witness 1332. Non-identifying data (also referred to herein as "non-identifying evidence") can comprise data that does not positively identify a person, but that potentially can be used to rule out one or more individuals as being the user or witness to be authenticated.

In some embodiments, authentication server 1320 can receive (e.g. in message 1340) a biometric signature (e.g. breathing patterns, PPG data, blood glucose data, EKG data, EEG and/or other brain activity data; blood pressure data, respiration data; and/or other physiologic information that comprises identifying and/or non-identifying data) of user 1302 from root client device 1304 and/or of witness 1332 from witness client device 1334. This biometric signature can be compared to a previously stored biometric signature of user 1302 and/or witness 1332, respectively. In some embodiments, the biometric signature can be used to identify (e.g. positively identify) the associated user 1302 and/or witness 1332. In other embodiments, the biometric signature comprises non-identifying data that does not definitively identify user 1302 and/or witness 1332, but it potentially does allow authentication server 1320 to determine when another person may be impersonating user 1302 and/or witness 1332 (e.g. when the recently recorded and previously stored biometric signatures do not sufficiently match, this indicating it is not the same person). Replay of the biometric signature may also be detected by requiring user 1302 and/or witness 1332 to take certain actions (e.g. coughing, holding of breath, and the like) during capture of the biometric signature, whereby authentication server 1320 can detect presence or absence of the requested action in the biometric signature.

In some embodiments, authentication server 1320 can receive (e.g. in message 1340) captured non-identifying movement data (e.g. facial expressions, head, eye, and/or other body part movement, reaction times, speed of movement, and the like) of user 1302 and/or witness 1332 from root client device 1304 and/or witness client device 1334, respectively. This movement data can be compared to a previously stored movement data 1306 of user 1302 and/or movement data 1336 of witness 1332. For example, by detecting certain characteristics in the movement data, authentication server 1320 can determine when another person may be impersonating user 1302 and/or witness 1332 (e.g. when certain characteristics do not match, and/or are missing).

In some embodiments, it can be advantageous for user 1302 to ask a second witness to confirm the identify of witness 1332. For example, the second witness may interact with and recognize witness 1332 and provide confirmation to authentication server 1320, providing a corresponding associative code (e.g. an associative code 1328 of a second witness client device 1334) such that the second witness remains anonymous to authentication server 1320 (and to third-party server 1321). Particularly, the three parties (user 1302, witness 1332, and the second witness) can be known to each other and can readily detect any imposters.

In some embodiments, a user (e.g. either of users 102, FIG. 1, and user 1302 FIG. 13) may wear virtual reality (VR) equipment to view a virtual site generated by software of application 208/1308 that is updated with scenes or challenges generated by authentication server 104/1320 and/or third-party server 105/1321. As described above, via application 208, user 102/1302 may be instructed to take certain actions (e.g. to look/scroll up to find a specified number or letter) or to move an object in the VR environment, to move a cursor using movement (e.g. facial, head, eye, and/or other body part movements), or to simply type and/or speak a response. The anonymous witness 204/1332 may confirm witnessing the movement of user 102/1302 (e.g. viewed in person or on the witness client device 108(2)/1334 when remote) by either following the actions or by inputting a confirmation (e.g. typing and/or speaking). Since the witness 204/1332 is not limited to moving a cursor via their movements, the witness may type or speak a response, and their captured movements can be evaluated by one or more bio behavioral algorithms of authentication server 104/1320 to confirm authenticity of witness 204/1332.

Particularly, captured movements of user 102/1302 (e.g. head, facial, eye, and/or other body part movements) can be evaluated to determine consistency with the requested actions that take place in VR environment and with movements and/or confirmation provided by witness 204/1332. In some embodiments, witness 204/1332 may provide instructions to user 102/1302. For example, user 102/1302 may be instructed by witness 204/1332 to look at a particular icon, such as the number three, which can be positioned in a particular screen location, such as at the top right corner of display 235/1305 of root client device 108(1)/1304. Authentication server 104/1320 receives data indicative of the icon selected, confirmation of the selected icon from witness 204/1332, and movement data indicative of one or both movements of user 102/1302 and witness 204/1332. When authentication server 104/1320 confirms that all data corresponds to the expected actions, and that user 102/1302 successfully authenticated the root client device 108(1)/1304, authentication server 104/1320 can determine that the authentication was successfully witnessed and that trust in user 102/1302 being who they claim to be is increased. Further, witness 204/1332 can also confirm (e.g. by responding 'yes' to a question presented by application 208/1308) that they confirm the identity of user 102/1302, such as after they have viewed and/or spoken with user 102/1302.

When witness 204/1332 is remote from user 102/1302, witness 204/1332 may follow actions (e.g. cursor movements) of user 102/1302 on display 237/1335 of witness client device 108(2)/1334. To control a cursor, for example, user 102/1302 may make head, eye, and/or other body part movements that are detected by root client device 108(1)/1304 and used to move a cursor (e.g. cursor 404 and/or 1004 described herein). As witness 204/1332 follows the cursor movement on display 237/1335, movements (e.g. head, eye, and/or other both part movements) made by witness 204/1332 are captured by witness client device 108(2)/1334. Accordingly, the captured movements of user 102/1302 and witness 204/1332 are similar, whereby authentication server 104/1320 can compare these movements to one another and to expected movements corresponding to the interactive task. These movements, although captured by sensors capable of biometric identification, may not include biometric information sufficiently to positively identify (authenticate) either of user 102/1302 or witness 204/1332. However, while capturing movement of user 102/1302, root client device 108(1)/1304 can authenticate user 102/1302 at least once, and witness client device 108(2)/1334 can authenticate witness 204/1332 at least once.

In some embodiments, application 1308 running on each root client device 1304 and witness client device 1334, accesses and manipulates a virtual world (e.g. via a website generated by authentication server 1320, or third-party server 1321), and make actions in that world. Where witness 1332 sees both user 1302 (e.g. via the video call) and actions in the virtual world, witness 1332 can confirm that user 1302 is who they say they are.

As described herein, authentication software 212 can be configured to evaluate behavioral biometric data to identify ("authenticate" herein) user 102. The authentication routines of the present inventive concepts performed by software 212 can utilize various biometric data analysis techniques (e.g. including AI algorithm techniques) to authorize a user 102

(e.g. comprising comprises one or more individuals) to: perform a transaction (e.g. a financial transaction); gain access to information (e.g. confidential information of a government agency and/or a corporation); change a password or unique identification; and/or otherwise be enabled to perform a task that requires authentication of user 102.

As described herein, system 100 can be configured to authenticate a user 102 comprising one or more individuals that are part of a "meta world" environment, such as an authentication involved in a meta world transaction and/or other interaction. System 100 can prevent or at least deter (e.g. make it more difficult) for a nefarious party to impersonate one or more users of a group of users of system 100 in a meta world.

System 100 can be configured to improve the reliability of an authentication of a user that currently is accomplished via a website that simply sends a confirmation code to the user's phone or email. The use of the witness client devices of the present inventive concepts as described herein provides additional levels of trust that may be desired or necessary for certain financial transactions or other events requiring high-level authentication of one or more individuals. In some embodiments, system 100 enables multiple individuals (e.g. a witness 204 comprising multiple people) to authenticate a single individual (user 102), for example in a meta world. In some embodiments, various members of a group of individuals can each authenticate each other, for example such that each member of the group is authenticated by at least two other members of the group. Group members can identify each other based on movements, key phrases, and/or other identifiers as described herein. A group of authenticated users can provide additional authentication to a particular user to authorize a transaction, such as a financial transaction, password change, and/or access to confidential information (e.g. confidential digital files). In some embodiments, one or more members of the group remains anonymous to one or more other members of the group and/or to a third-party entity (e.g. a third-party entity requesting the authentication). For example, the user 102 being authenticated can remain anonymous to the third-party entity, and/or a witness 204 authenticating the user 102 can remain anonymous to the third-party entity. Anonymity of either or both user 102 and/or witness 204 can be used to prevent a subsequent malicious act by a nefarious party (e.g. to greatly reduce the risk of impersonation of that person and/or theft of that person's cell phone or other device including identifying information).

In some embodiments, third-party server 105 sends a request (e.g. request 250) to authentication server 104, and authentication server 104 sends a code (e.g. task code 232) to root client device 108(1). The code can then be transferred to witness client device 108(2), such as via Bluetooth, such that witness client device 108(2) can register with authentication server 104 by providing the code. After witness client device 108(2) is registered with authentication server 104, a call (e.g. a video call) can be established between root client device 108(1) and witness client device 108(2), such that user 102 and witness 204 can authenticate each other, such as to provide authentication to entity 202 (e.g. to validate a wire transfer and/or a password change). In some embodiments, behavioral biometrics such as voice impediments or other vocal features, facial movements, eye movements, eye blinks (e.g. eye blink patterns), limb and/or digit movements, and/or reaction times of any of these, can be tracked by system 100 (e.g. during a standard call or video call). Behavioral biometrics can be assessed by system 100 to further authenticate user 102 and/or witness 204. In some embodiments, system 100 receives information regarding user 102 and/or witness 204 that is used in a training procedure of an AI algorithm of system 100 (e.g. an algorithm of application 208), such as to authenticate user 102 and/or witness 204 via at least an AI algorithm.

In some embodiments, system 100 includes an algorithm (e.g. an algorithm of application 208), such as an AI algorithm, that evaluates data collected by one or more sensors of a client device 108 (e.g. one or more motion sensors, physiologic sensors, and/or imaging sensors) to authenticate the user 102 of root client device 108(1). For example, system 100 can evaluate the habits of user 102 (e.g. how root client device 108(1) is manipulated by the user 102 during regular use), and can compare that evaluation data to data collected during an authentication to confirm user 102 is the user of root client device 108(1).

In some embodiments, authentication server 104 provides a code to both user 102 and witness 204, as well as information for the creation of a numeric input display for user 102 and witness 204 to view and enter the code (e.g. on a screen of their associated client devices 108). The input display provided to user 102 (e.g. to be displayed on root client device 108(1)) can be different than the display provided to witness 204 (e.g. to be displayed on witness client device 108(2)). For example, the display provided to user 102 can comprise a "number pad" (e.g. three rows of three numbers with the number 1 in the bottom left and the number nine in the top right), and the display provided to witness 204 can comprise a "phone keypad" display (e.g. three rows of three numbers, with the number one in the top right, and the number nine in the bottom right). Authentication server 104 can be configured to analyze both the code input by user 102 and/or witness 204 and at what location on client devices 108 were each digit input, such as to provide an additional level of trust. In some embodiments, the code is entered via eye-tracking or other body part movement, such that user 102 and/or witness 204 enters the code by looking at or otherwise moving relative to the digits displayed on client devices 108.

In some embodiments, user 102 and/or witness 204 are authenticated (e.g. via facial recognition or other routine described herein) by client devices 108 at regular intervals (e.g. semi-continuously) during an authentication process. In some embodiments, facial recognition is performed along with motion tracking (e.g. eye tracking), such that as a user enters a code (e.g. via motions, such as eye tracking), while the user is further authenticated (e.g. simultaneously authenticated) via facial recognition. The eye or other body part motion tracking can also be correlated to the layout of the numbers displayed to the user.

In some embodiments, user 102 can move a cursor displayed on root client device 108(1) to a location of a desired icon (e.g. a number), such as to enter an authentication code. The user can move the cursor with eye movement (e.g. via eye tracking enabled by a client device 108) and/or via head, facial, and/or other body part. While the cursor is being manipulated by the user's movements, system 100 can perform facial recognition (e.g. multiple times, such as by continuously and/or intermittently performing multiple facial recognitions). In some embodiments, system 100 also performs (e.g. continuously and/or intermittently performs) behavioral biometric authentication of the user, such as while an authentication code is being input to a client device 108, such as by monitoring facial movement, head movement, blinking, and/or other body part movement and assessing the movement multiple times (e.g. at equal intervals of time).

In some embodiments, a third-party requiring authentication of a user (e.g. a bank) sends out multiple sets of data (e.g. comprising pictures, numbers, and/or other data) to different individuals (e.g. to at least one user 102 and at least one witness 204). Based on the motion of each user 102 and/or witness 204 via an associated client device 108, the third party can differentiate these individuals based on body part motions performed by each and the associated set of data sent to each. In these embodiments, the third party may not receive any images (e.g. facial or other identifying images) of one or more (e.g. all) of the individuals receiving the sets of data (e.g. authenticated via the sets of data or otherwise).

In some embodiments, system 100 is configured to authenticate a user 102 to a third party, using a witness 204, where either the user 102, the witness 204, or both, remain anonymous (e.g. to each other, and/or to the third party receiving the authentication). Various identification data can be gathered from user 102 and/or witness 204, such as is described herein. An anonymous individual (e.g. either or both user 102 or witness 204) can receive a code to be used for confirmation, also as described herein. In some embodiments, a physiologic parameter of an individual is taken (e.g. a PPG reading taken via a sensor of a client device 108) while an image (e.g. a facial image) of the individual is simultaneously created, each providing data used for authentication. In some embodiments, a web-meeting is used in the authentication of an event (e.g. a wire transfer of money and/or confidential information), where a first individual could confirm the identity of a second, while the first individual, the second individual, or both, remain confidential (e.g. to the third party).

In some embodiments, system 100 can be configured to present a set of images (e.g. dozens of images can be displayed) to user 102 and witness 204, where one or more of the images are familiar to these individuals, and one or more of the images are not familiar. User 102 and witness 204 can each select the familiar images, confirming a familiarity (e.g. known relationship) between user 102 and witness 204. In some embodiments, images are displayed to user 102 and/or witness 204 in a meta world environment, such as a virtual and/or augmented reality environment. In some embodiments, images can be selected by these individuals by focusing their attention (e.g. eye gaze) on the familiar images and/or otherwise selecting the familiar images.

In some embodiments, an authentication performed by system 100 can occur in a meta world, such as when user 102 and witness 204 are virtually represented by respective avatars. In some embodiments, the avatar of witness 204 can be displayed to user 102 in a familiar way and displayed to any third-party users as an anonymous avatar, such that witness 204 can remain anonymous.

In some embodiments, authentication server 104 is configured to protect the identity of witness 204 from a third-party (e.g. not sending the information to third-party server 105), for example by providing that all communications between witness client device 108(2) and third-party server 105, do not include the actual identity of witness 204.

In some embodiments, authentication server 104 uses a "spread spectrum code", where a portion of the authentication code is delivered to user 102 and a portion is delivered to witness 204 (e.g. one or more witnesses 204). User 102 and witness 204 (e.g. at least two individuals) combine the code and return the complete code to authentication server 104 (e.g. via a client device 108) to authenticate user 102. In some embodiments the spread spectrum code is presented to these individuals as various images, numerals, and/or other identifiable data. In some embodiments the code is presented to the individuals in a meta world.

In some embodiments, one or more client devices 108 (e.g. at least one of root client device 108(1) and/or witness client device 108(2)) comprises a virtual and/or augmented reality device, such as a Microsoft HoloLens and/or a Meta Oculus.

In some embodiments, one or more client devices 108 (e.g. at least one of root client device 108(1) and/or witness client device 108(2)) is configured to perform a retinal scan. In these embodiments, the client device 108 can be configured to perform other biometric identification of user 102 and/or witness 204.

In some embodiments, authentication server 104 is configured to authenticate a user 102 by matching a unique facial ID with one or more other biometric identifiers (e.g. one or more behavioral biometric identifiers, such as a behavioral identifier found by measuring facial movement and/or eye movement).

In some embodiments, some user 102 identifying information (e.g. a retinal scan) remains local to the user 102 (e.g. on root client device 108(1)), and other identifying information, for example behavioral information such as facial movement information, is transmitted to authentication server 104. A client device 108 can confirm to authentication server 104 that the retinal scan matches the intended user (e.g. without actually sending the retinal scan information), and authentication server 104 can confirm that the behavioral information that is received by server 104 matches the user 102.

In some embodiments, authentication server 104 provides a virtual maze or other puzzle to a group of individuals in a meta world, where clues to solving the puzzle are presented to the individuals (e.g. as familiar sounds or objects, for example information that is familiar to the group of individuals but would otherwise seem random to an imposter). In some embodiments, the puzzle is generated by an AI algorithm. Biometric data (e.g. behavioral biometric data) and/or other authentication data can be collected by system 100 from the individuals while the puzzle is being solved (e.g. via their associated client devices 108). In some embodiments, an algorithm, such as an AI algorithm, analyzes the data collected (e.g. at least behavioral biometric data) to detect an imposter is present within the group (e.g. an imposter identification performed as the puzzle is solved). Once the puzzle is solved, if no imposter was identified, each member of the group of individuals are then considered authenticated by system 100. Each individual can be classified as a user 102, a witness 204, or both.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A system, comprising:
an authentication server;
a root client device associated with a user;
a witness client device selected from a plurality of witness devices;

the authentication server generating a task code that defines an interactive task, and that is output to both the root client device and the witness client device, wherein the authentication server receiving from the root client device, (a) an authentication result indicative of biometric authentication of the user on the root client device, and (b) first movement data indicative of movement of the user that performs the interactive task as captured by the root client device;

the authentication server further receiving from the witness client device second movement data indicative of movement of the user that performs the interactive task as captured by the witness client device;

the authentication server storing and executing authentication software that analyzes the first movement data and the second movement data to determine whether the first movement data and the second movement data match expected movement that corresponds to the interactive task, wherein:

successful authentication by the user is determined when the authentication result indicates success and the first movement data, and the second movement data match the expected movement; and the root client device and the witness client device are positioned adjacent one another while the user performs the interactive task.

2. The system of claim 1, wherein the first movement data and the second movement data indicate the facial movement of the user during performance of the interactive task, as captured by the root client device and the witness client device, without biometric information included for identification.

3. The system of claim 1, wherein the root client device and the witness client device each has a display, and wherein at least a part of the display of the root client device and at least a part of the display of the witness client device form a virtual screen that displays the interactive task.

4. The system of claim 3, wherein the interactive task comprises cursor navigation on the virtual screen that is controlled by head/facial/eye movement of the user.

5. The system of claim 1, wherein the interactive task comprises one or more of: a maze puzzle, a sequence of on screen facial movement directives, a sequence of audible facial movement directives, a series of consecutive single digit numbers that do not repeat.

6. The system of claim 1, wherein perspective differences are analyzed between the root client device and the witness client device to determine whether the first movement data and the second movement data match.

7. The system of claim 1, wherein the authentication software analyzes temporal and direction analysis to determine whether the first movement data and the second movement data match.

8. The system of claim 7, wherein the direction analysis is analyzed to determine whether the first movement data matches the expected movement.

9. The system of claim 1, wherein the task code defines a type of interactive task and the expected movement.

10. A witnessed authentication system, comprising:
an authentication server;
a first instance of an application executing on a root client device constructed and arranged to receive a task code from the authentication server; and
a second instance of the application executing on a witness client device to receive the task code from the authentication server, wherein:

the first instance is configured to generate a first part of a virtual screen based at least upon the task code that defines an interactive task for display by the root client device;

the second instance is configured to generate a second part of a virtual screen based at least upon the task code that defines the interactive task for display by the witness client device;

the first instance is configured to capture first movement data detected by the root client device as a user of the root client device performs the interactive task;

the first instance invokes concurrently with the step the first instance is captured, at least one biometric authentication of the user by the root client device;

the first instance sends as a result of the biometric authentication the first movement data to the authentication server;

the second instance is configured to capture concurrently with the step the first instance is captured, second movement data detected by the witness client device as the user performs the interactive task;

the second instance sends the second movement data to the authentication server; and the result of the biometric authentication, the first movement data, and the second movement data are indicative of authenticity of the user.

11. The witnessed authentication system of claim 10, wherein the biometric authentication invokes the first instance that causes the root client device to perform a facial authentication of user to determine the result.

12. The witnessed authentication system of claim 10, wherein the first part of the virtual screen comprises a left half of the virtual screen when the roto client device is positioned left-adjacent to the witness client device.

13. The witness authentication system of claim 10, wherein the application detects one or more of a head position, a face position, and an eye position of the user to control a cursor of the interactive task to move on the virtual screen.

14. The witnessed authentication system of claim 13, wherein the first instance and the second instance cooperate to move the cursor between displays of the root client device and the witness client device based upon one or more of the head positions, the face position, and the eye position.

15. The witnessed authentication system of claim 13, wherein one of the first instance and the second instance highlights a symbol on the virtual screen when the cursor is proximate the symbol, and wherein when the cursor remains positioned proximate the symbol for a predefined length of time the symbol is selected when the proximity of the cursor is not moved from proximity of the symbol.

16. A system, comprising:
an authentication server;
a root client device; and
a witness client device;
wherein the root client device comprising:
a first computer-readable media, which comprises instructions for receiving a task code received from the authentication server;
a display that, based upon the task code, generates a first part of a virtual screen that defines an interactive task implemented by both the root client device and the witness client device;
the instructions of the first computer-readable media further:

synchronizing the interactive task with the witness client device;
invoking a biometric authentication to generate an authentication result;
capturing first movement data as the interactive task is performed; and
outputting the authentication result and the first movement data to the authentication server;
wherein the witness client device comprising:
a second computer-readable media, which comprises instructions for receiving the task code from one of the authentication server or the root client device;
a display that, upon the task code, generates at least part of the virtual screen of the interactive task implemented by both the root client device and the witness client device;
the instructions of the second computer-readable media further:
synchronizing the interactive task with the root client device;
capturing second movement data detected by the witness device as the interactive task is performed; and
outputs the second movement data to the authentication server.

17. The system of claim 16, further comprising a third computer-readable media in the authentication server, which comprises instructions for:
generation of the task code that defines the interactive task and expected movement;
the task code sent to the root client device;
the authentication result and the first movement data from the root client device is received;
the second movement data sent is received from the witness client device;
analysis of the first movement data, the second movement data, and the expected movement to determine whether the first movement data, the second movement data, and the expected movement match; and
determination of success of the witness authentication when the authentication result indicates successful biometric authentication of the user to the root client device and the first movement data, the second movement data, and the expected movement match.

18. A remotely witnessed authentication system, comprising:
a root client device of a user associated with an account;
a witness client device selected from a plurality of witness client devices that receives an associative code, eligibility of an anonymous witness client device to witness authentication of the user is determined based on the associative code;
an authentication server that receives from the root client device, a request for witnessed authentication of the user, and that:
randomly generates a task code that defines an interactive task and expected movement of the user performing the interactive task, the interactive task being unpredictable;
sends the task code to the root client device and the witness client device;
receives task updates received from the root client device that define changes to the interactive task as the user performs the interactive task on the root client device;
sends the task updates to the witness client device for output to a display of the witness client device;
receives a first authentication result and movement data from the root client device, the first authentication results defines whether at least one biometric authentication of the user to the root client device during the interactive task was successful, and the movement data defines movement, detected by the root client device, of the user that performs the interactive task;
receives a second authentication result and evidence data from the witness client device, the second authentication result defines whether at least one biometric authentication of a witness to the witness client device while the user performed the interactive task was successful, and the evidence data provides evidence that the witness watched, on the witness client device, the user perform the interactive task;
analyzes the movement data, the evidence data, and the expected movement to determine whether the movement data and the evidence data match the expected movement; and
determines a success of the witnessed authentication when both the first authentication result and the second authentication result indicate successful biometric authentication of the user and the witness, and when the movement data and the evidence data match the expected movement.

19. The remotely witnessed authentication system of claim 18, further comprises analysis that allows for expected differences between the movement data, the evidence data, and the expected movement.

20. The remotely witnessed authentication system of claim 18, wherein the analysis compares a sequence and direction of the expected movement that ignores temporal differences.

21. The remotely witnessed authentication system of claim 18, the randomly generated task code further comprising:
task code that generates as a pseudo-random number;
a type of interactive task that determines the task code that corresponds;
task instructions that generate based on the type of interactive task, and the task code; and
the expected movement is determined based upon the task instructions.

22. The remotely witnessed authentication system of claim 18, wherein the selected witness client devices comprise the witness client device that receives from a list of witness client devices authorized to perform the witnessed authentication that corresponds to the account of the user.

23. The remotely witnessed authentication system of claim 18, wherein the witness client device selects the witness client device that comprises an ID received of the witness client device from the root client device.

24. The remotely witnessed authentication system of claim 18, wherein the root client device and the witness client device implement a video call between the user and the witness while the user performs the interactive task, the evidence data further comprises a confirmation that the witness recognizes the user.

25. An anonymous witness authentication system comprises:
a root client device associated with a user;
an anonymous witness client device selected from a plurality of witness client devices that receives an associative code, wherein eligibility of the anonymous witness client device to witness authentication of the user is determined based on the associative code;

an authentication server that:
: receives from the root client device associated with a user a request for witnessed authentication;
: randomly generates a task code that defines an interactive task;
: sends the task code to both root client device and the anonymous witness client device;
: receives, from the anonymous witness client device, a second authentication result and second movement data captured by the anonymous witness client device, the second movement data that is captured by the user that performs the interactive task;
: analyzes the first movement data and the second movement data to determine whether the first movement data and the second movement data match each other and whether the first movement data and the second movement data match expected movement that corresponds to the interactive task; and
: determines that the user is successfully authenticated when both the first authentication result and the second authentication result indicate success and the first movement data and the second movement data match each other and match the expected movement;
: wherein the root client device and the anonymous witness client device are positioned adjacent to one another while the user performs the interactive task.

26. An anonymous witness authentication system comprises:
a root client device associated with a user;
a witness client device selected from a plurality of witness client devices that receives an associative code, wherein eligibility of the anonymous witness client device to witness authentication of the user is determined based on the associative code;
an authentication server that:
: receives from the root client device a request for witnessed authentication;
: randomly generates a task code that defines an interactive task and expected movement to complete the interactive task;
: sends the task code to both root client device and the anonymous witness client device;
: receives task updates from the root client device that define changes to the interactive task as the user performs the interactive task on the root client device;
: sends the task updates to the anonymous witness client device for output to a display of the anonymous witness client device;
: receives from the root client device, (a) an authentication result indicative of biometric authentication of the user on the root client device, and (b) movement data captured by the root client device as the user performed the interactive task;
: receives from the anonymous witness client device, a second authentication result and evidence data captured by the anonymous witness client device, the evidence that is indicative of a witness that views actions of the user that performs the interactive task, and indicates the witness recognizes the user;
: analyzes the movement data and the evidence data to determine (i) whether the movement data matches the expected movement for the interactive task, (ii) whether the witness viewed the user that performs the interactive task, and (iii) whether the witness recognizes the user; and
: determines that the user is successfully authenticated when both the first authentication result and the second authentication result indicate success, the movement data matches the expected movement, the evidence data indicates that the witness viewed the user that performs the interactive task, and the evidence data indicates that the witness recognized the user.

27. The anonymous witness authentication of claim 26, wherein the root client device and the anonymous witness client device implement a video call between the user and the witness while the user performs the interactive task.

* * * * *